(12) United States Patent
Anselm et al.

(10) Patent No.: US 9,004,187 B2
(45) Date of Patent: Apr. 14, 2015

(54) INERTING METHOD FOR PREVENTING AND/OR EXTINGUISHING FIRE AS WELL AS INERTING SYSTEM TO REALIZE THE METHOD

(75) Inventors: Eberlein Anselm, Hannover (DE); Peter Uwe Kersten, Wietze (DE)

(73) Assignee: Amrona AG, Zug (CH)

( * ) Notice: Subject to any disclaimer, the term of this patent is extended or adjusted under 35 U.S.C. 154(b) by 636 days.

(21) Appl. No.: 13/323,110

(22) Filed: Dec. 12, 2011

(65) Prior Publication Data

US 2012/0145417 A1 Jun. 14, 2012

(30) Foreign Application Priority Data

Dec. 10, 2010 (EP) ..................... 10194584

(51) Int. Cl.
*A62C 3/16* (2006.01)
*A62C 37/44* (2006.01)
*A62C 2/00* (2006.01)
*A62C 99/00* (2010.01)

(52) U.S. Cl.
CPC .................. *A62C 99/0018* (2013.01)

(58) Field of Classification Search
CPC .................................................. A62C 99/0018
USPC ............. 169/11, 43–46, 54, 56, 60, 61
See application file for complete search history.

(56) References Cited

U.S. PATENT DOCUMENTS

| | | | |
|---|---|---|---|
| 6,676,081 B2 * | 1/2004 | Grabow et al. ............ | 244/129.2 |
| 6,739,399 B2 * | 5/2004 | Wagner et al. ................. | 169/45 |
| 2002/0185283 A1 * | 12/2002 | Taylor ............................ | 169/43 |
| 2005/0229968 A1 * | 10/2005 | Jones et al. .................... | 137/209 |
| 2008/0078563 A1 * | 4/2008 | Hock et al. ...................... | 169/49 |
| 2008/0087445 A1 * | 4/2008 | Wagner ........................... | 169/45 |
| 2008/0135265 A1 * | 6/2008 | Wagner et al. .................. | 169/45 |
| 2008/0156505 A1 * | 7/2008 | Wagner ........................... | 169/11 |
| 2008/0156506 A1 * | 7/2008 | Wagner et al. .................. | 169/11 |
| 2009/0038810 A1 * | 2/2009 | Wagner ........................... | 169/45 |
| 2009/0038811 A1 * | 2/2009 | Wagner ........................... | 169/46 |
| 2010/0155088 A1 | 6/2010 | Eberlein et al. | |

FOREIGN PATENT DOCUMENTS

| | | |
|---|---|---|
| DE | 102 35 718 | 4/2004 |
| EP | 2 204 219 | 7/2010 |
| EP | 2 233 175 | 9/2010 |

OTHER PUBLICATIONS

European Search Report dated May 23, 2011, corresponding European Application No. EP 10 194 584.8.

* cited by examiner

*Primary Examiner* — Darren W Gorman
(74) *Attorney, Agent, or Firm* — Alston & Bird LLP

(57) ABSTRACT

The invention relates to an inerting method as well as an inerting system (1) to set and/or maintain a reduced oxygen content in an enclosed room (2), wherein a gas separation system (3.1, 4.1; 3.2, 4.2; 3.3, 4.3) is provided which separates off at least a portion of the oxygen from an initial gas mixture provided in a mixing chamber (6) and by so doing, provides a nitrogen-enriched gas mixture. In order to optimize the operation of the inerting system (1), the invention provides for a portion of the air to be withdrawn from the enclosed room (2) and admixed with fresh air in the mixing chamber (6).

9 Claims, 9 Drawing Sheets

INERTING METHOD FOR PREVENTING AND/OR EXTINGUISHING FIRE AS WELL AS INERTING SYSTEM TO REALIZE THE METHOD

CROSS-REFERENCE TO RELATED APPLICATIONS

This application claims priority to European Application No. 10 194 584.8 filed Dec. 10, 2010, which is hereby incorporated by reference in its entirety.

BACKGROUND

1. Technical Field

The present invention relates to an inerting method for preventing and/or extinguishing fire in which in a predefinable oxygen content which is lower than normal ambient air is set and maintained in the spatial atmosphere of an enclosed room.

2. Description of Related Art

The invention further relates to an inerting system to set and/or maintain a predefinable oxygen content in the spatial atmosphere of an enclosed room which is reduced compared to the normal ambient air, wherein the inerting system comprises a gas separation system which separates off at least a portion of the oxygen from an initial gas mixture containing nitrogen and oxygen and by so doing, provides a nitrogen-enriched gas mixture at the outlet of the gas separation system, and wherein the inerting system comprises a supply line system for supplying the nitrogen-enriched gas mixture to the enclosed room.

An inerting system of the above type particularly relates to a system to reduce the risk of and extinguish fires in a protected room subject to monitoring, wherein the protected room is continuously rendered inert for the purpose of preventing or controlling fire. The mode of action of such an inerting system is based on the recognition that the risk of fire in enclosed rooms can be countered by continuously lowering the concentration of oxygen in the respective area to a value of e.g. approximately 12-15% by volume in normal cases. At such an oxygen concentration, most combustible materials can no longer ignite. The main areas of application are in particular IT areas, electrical switchgear and distributor compartments, enclosed facilities as well as storage areas for high-value commodities.

A method as well as a device of the type cited at the outset is known from the EP 2 204 219 A1 printed publication. A return system is employed here to withdraw a portion of the ambient air from within the enclosed room and feed it to a mixing chamber. Fresh air is added to the portion of air withdrawn from the room in the mixing chamber. The gas mixture thus produced (initial gas mixture) is fed to a compressor to be compressed there and then channeled to a nitrogen generator. The nitrogen generator separates off at least a portion of the oxygen from the initial gas mixture provided, thus producing a nitrogen-enriched gas mixture at the outlet of the nitrogen generator. This nitrogenated gas mixture is thereafter piped into the enclosed room in order to lower the oxygen content of the room's spatial atmosphere to a predetermined inerting level or to maintain it at a preset inerting level.

In practice, the method of returning oxygen-reduced air employed in printed publication EP 2 204 219 A1 to enable a more effective nitrogen generation for fire protection purposes calls for a return method which is adapted as optimally as possible to the gas separation system employed. Care must in particular be taken that the initial gas mixture provided in the mixing chamber is always in an optimized state for the gas separation system to be employed. This requirement is especially applicable when a plurality of nitrogen generators with respectively associated compressors are employed as the gas separation system. Care must then in particular be taken that the respective suction action of each individual nitrogen generator has no impact on any of the other nitrogen generators. This method has to factor in that a nitrogen generator which uses membrane technology to separate gases needs to exhibit a constant suction action. On the other hand, when a nitrogen generator is employed which makes use of the above-described PSA technology or the above-described VPSA technology to separate gases, the fact that such a nitrogen generator can operate with pulsed suction action needs to be considered.

Particularly in large-volume areas such as for instance warehouses, it is frequently desired to use a plurality of nitrogen generators in parallel for setting and maintaining a predefined or predefinable inerting level, whereby it can occur that the nitrogen generators are based on different gas separation technologies. Such a case requires a costly and independent return line for each nitrogen generator from the enclosed room to the respective nitrogen generator in order to ensure the optimum operation of each nitrogen generator. This requirement leads to a relatively complex structure to the inerting system.

Starting from this problem as posed, the present invention is based on the task of further developing the inerting system known from the EP 2 204 219 A1 printed publication, respectively the inerting method known from the EP 2 204 219 A1 printed publication, such that a predefined inerting level can be set and maintained in the enclosed room in the simplest yet most efficient manner possible.

According to a first aspect of the invention related to the inerting method, an initial gas mixture containing oxygen, nitrogen and other components as applicable is provided in a mixing chamber, wherein a gas separation system separates off at least a portion of the oxygen from this initial gas mixture provided and by so doing, a nitrogen-enriched gas mixture is provided at the outlet of the gas separation system, and wherein this nitrogen-enriched gas mixture is piped into the spatial atmosphere of the enclosed room. A return line system connecting the enclosed room to the mixing chamber is provided to supply the initial gas mixture, wherein a fan mechanism is further provided to withdraw a portion of the ambient air from within the enclosed room, preferably in regulated manner, and feed it to the mixing chamber, wherein the withdrawn portion of the room's air is admixed with fresh air, preferably in regulated manner, by means of a fan mechanism provided in the fresh air-supply line system connected to the mixing chamber.

A further aspect of the invention with respect to the method provides for the fan mechanism provided in the return supply line system to be controlled such that the volume of air withdrawn from the room per unit of time and fed to the mixing chamber be set such that the difference between the pressure prevailing in the mixing chamber and the pressure of the external ambient atmosphere does not exceed a predefined or predefinable upper threshold nor fall short of a predefined or predefinable lower threshold.

A further aspect of the invention with respect to the method provides for the fan mechanism provided in the fresh air supply line system to be controlled such that the volume of fresh air mixed with the withdrawn volume of room air per unit of time is set such that the difference between the pressure prevailing in the mixing chamber and the pressure of the external ambient atmosphere does not exceed a predefined or predefinable upper threshold nor fall short of a predefined or predefinable lower threshold.

A further aspect of the invention relating to the inerting system provides for the inerting system to further comprise a mixing chamber, preferably a mixing chamber configured as a mixing tube, which serves to provide the initial gas mixture, wherein a first line system opens into the mixing chamber, with a portion of the spatial air from inside the enclosed room being withdrawn and fed to the mixing chamber through said first line system, and wherein a second line system opens into the mixing chamber, with fresh air being supplied to the mixing chamber through said second line system.

A further aspect of the invention with respect to the inerting system provides for the inerting system to further comprise a first fan mechanism controllable by a control unit in the first line system and a second fan mechanism system controllable by the control unit in the second line.

A further aspect of the invention with respect to the inerting system provides for the control unit of an inerting system provided with such a control unit to be designed so as to control the first fan mechanism such that the amount of air withdrawn from the room per unit of time and fed to the mixing chamber by means of said first fan mechanism can be set such that the difference between the pressure prevailing in the mixing chamber and the pressure of the external ambient atmosphere does not exceed a predefined or predefinable upper threshold nor fall short of a predefined or predefinable lower threshold.

A further aspect of the invention with respect to the inerting system provides for the control unit of an inerting system provided with such a control unit to be designed so as to control the second fan mechanism such that the volume of fresh air admixed to the spatial air withdrawn from the room per unit of time by means of said second fan mechanism can be set such that the difference between the pressure prevailing in the mixing chamber and the pressure of the external ambient atmosphere does not exceed a predefined or predefinable upper threshold nor fall short of a predefined or predefinable lower threshold.

A further aspect of the invention with respect to the inerting system provides for the inerting system to comprise a control unit which is designed to control the gas separation system such that the residual oxygen content of the nitrogen-enriched gas mixture is changed as a function of the oxygen content prevailing in the spatial atmosphere of the enclosed room at that respective moment.

The resulting preventative or extinguishing effect of this inerting method is based on the principle of oxygen displacement. As is generally known, normal ambient air consists of about 21% oxygen by volume, about 78% nitrogen by volume and about 1% by volume of other gases. In order to be able to effectively reduce the risk of a fire breaking out in a protected room, the concentration of oxygen in the respective room is lowered by introducing inert gas such as e.g. nitrogen. For most solids, a fire-extinguishing effect is known to occur when the percentage of oxygen falls below 15% by volume. Depending on the flammable materials contained within a protected room, a further lowering of the oxygen percentage to e.g. 12% by volume may be necessary. Thus, continuously rendering a protected room inert will also effectively minimize the risk of a fire breaking out in said protected room.

The inventive method, inerting system respectively, capitalizes on the knowledge that the nitrogen purity of the nitrogenated gas mixture provided at the outlet of the gas separation system, respectively the residual oxygen content of the nitrogenated gas mixture provided at the outlet of the gas separation system, has an effect on the so-called "drawdown time." The term "drawdown time" refers to the length of time required to set a predefined inerting level in the spatial atmosphere of the enclosed room.

The specific knowledge capitalized on herein is that as nitrogen purity increases, the air factor of the gas separation system rises exponentially.

The term "air factor" refers to the ratio of the volume of initial gas mixture provided the gas separation system per unit of time to the volume of nitrogenated gas provided at the outlet of the gas separation system per unit of time. A nitrogen generator will usually allow the arbitrary selection of any nitrogen purity desired at the outlet of the gas separation system, with this value able to be set on the nitrogen generator itself. Generally speaking, the lower the nitrogen purity is set, the lower the operating costs for the nitrogen generator will be. In particular, the compressor then only needs to run for a comparatively shorter period of time when providing a nitrogenated gas mixture at the set nitrogen purity at the outlet of the gas separation system.

With respect to the costs incurred to operate the inerting system to inert the room, however, other additional factors need to be taken into account. These particularly include the purge factors involved in displacing the oxygen in the spatial atmosphere of the enclosed room by means of the nitrogen-enriched gas mixture provided at the outlet of the gas separation system until the predefined inerting level is reached, respectively maintained. These purge factors particularly include the amount of nitrogenated gas provided by the gas separation system per unit of time, the spatial volume of the enclosed room, and the difference between the oxygen content prevailing in the spatial atmosphere of the enclosed room at that respective moment versus the oxygen content corresponding to the predefined inerting level. To be hereby considered is that in terms of the drawdown time, the nitrogen purity of the gas mixture provided at the outlet of the gas separation system, respectively the residual oxygen content of the nitrogenated gas mixture, likewise plays a crucial role, since the purging operation goes faster the lower the residual oxygen content in the nitrogenated gas mixture.

The term "gas separation system" as used herein is to be understood as a system which can effect the separation of an initial gas mixture comprising at least the components of "oxygen" and "nitrogen" into an oxygen-enriched gas as well as a nitrogen-enriched gas. The functioning of such a gas separation system is usually based on the effect of gas separation membranes. The gas separation system used in the present invention is primarily designed to separate oxygen from the initial gas mixture. This type of gas separation system is frequently also referred to as a "nitrogen generator."

This type of gas separation system makes use of a membrane module or the like, for example, whereby the different components contained in the initial gas mixture (e.g. oxygen, nitrogen, noble gases, etc.) diffuse through the membrane at different speeds based on their molecular structure. A hollow fiber membrane can be used as the membrane. Oxygen, carbon dioxide and hydrogen have a high diffusion rate and because of that, escape from the initial gas mixture relatively quickly when passing through the membrane module. Nitrogen having a low diffusion rate percolates through the hollow fiber membrane of the membrane module very slowly and thereby concentrates when passing through said hollow fiber/membrane module. The nitrogen purity, the residual oxygen content respectively, of the gas mixture exiting the gas separation system is determined by the flow velocity. Varying the pressure and the volumetric flow rate allows the gas separation system to be adjusted to the required nitrogen purity and necessary volume of nitrogen. Specifically, the purity of the nitrogen is regulated by the speed at which the gas passes through the membrane (dwell time).

The separated oxygen-enriched gas mixture is usually concentrated and discharged into the environment at atmospheric pressure. The compressed, nitrogen-enriched gas mixture is provided at the outlet of the gas separation system. An analysis of the product gas composition ensues by measuring the residual oxygen content in volume percent. The nitrogen content is calculated by subtracting the measured residual oxygen content from 100%. In so doing, it needs to be considered that although this value is designated as the nitrogen content or the nitrogen purity, it is in fact the inert content as this component is not only comprised of just nitrogen but also other gas components such as for example noble gases.

The gas separation system, nitrogen generator respectively, is usually fed compressed air which has been purified by upstream filter units. It is in principle conceivable to use a pressure swing process (PSA technology) utilizing two molecular sieve beds to provide the nitrogen-enriched gas, wherein the two sieves are alternatingly switched from a filter mode to a regeneration mode, thereby yielding the flow of nitrogen-enriched gas.

As long as it is not imperative to have a continuous flow of nitrogen-enriched gas at the outlet of a pressure swing-operating nitrogen generator, just one molecular sieve bed can also be used which is alternatingly switched into an adsorption mode upon the application of pressure, during which the nitrogen-enriched gas is provided at the outlet, and thereafter into a desorption mode at lower pressure during which the oxygen-enriched air within the proximity of the molecular sieve bed can be purged off.

When a nitrogen generator utilizes for example a membrane technology, the process capitalizes on the general knowledge that different gases diffuse through materials at different speeds. In the case of nitrogen generators, the different diffusion rates of the principal components of air; i.e. nitrogen, oxygen and water vapor, are used to generate a flow of nitrogen, respectively nitrogen-enriched air. In detail, to technically realize a membrane technology-based nitrogen generator, a separation material through which water vapor and oxygen can readily diffuse, but which only affords a low diffusion rate for nitrogen, is applied to the outer surfaces of the hollow fiber membranes. When air flows through the inside of such a treated hollow fiber, the water vapor and oxygen quickly diffuse outward through the hollow fiber wall while the nitrogen is largely retained within the fiber such that a strong concentration of nitrogen builds up during passage through the hollow fiber. The effectiveness of this separation process essentially depends on the flow rate in the fiber and the pressure differential over the hollow fiber wall. With a decreasing flow rate and/or a higher pressure differential between the interior and the exterior of the hollow fiber membrane, the purity of the resultant nitrogen flow increases. Generally speaking, a membrane technology-based nitrogen generator can thus regulate the degree of nitrogenization to the nitrogenated air provided by the nitrogen generator as a function of the dwell time of the compressed air provided by the compressed air source in the air separation system of the nitrogen generator.

If, on the other hand, the nitrogen generator is for example based on PSA technology, specially-treated activated charcoal makes use of the different binding rates of the atmospheric oxygen and atmospheric nitrogen. The structure of the activated charcoal employed is thereby changed such that a large number of micropores and submicropores (d<1 nm) develop over an extremely large surface area. At this pore size, the oxygen molecules of the air diffuse into the pores substantially faster than the nitrogen molecules such that the air in the proximity of the activated charcoal becomes enriched with nitrogen. A PSA technology-based nitrogen generator can thus—as is also the case with a membrane technology-based generator—regulate the degree of nitrogenization to the nitrogenated air provided by the nitrogen generator as a function of the dwell time of the compressed air provided by the compressed air source in the nitrogen generator.

As described above, these types of PSA technology-based nitrogen generators need to be alternately operated in an adsorption mode and a desorption mode, whereby pressure has to be applied to the molecular sieve bed during the adsorption mode (filter mode) in order to ensure sufficient diffusion of oxygen molecules in the pores of the activated charcoal (carbon granules, CMS) for the generating process. Compared to the higher sieve bed pressure versus the ambient pressure during the adsorption phase, the pressure is reduced during the subsequent desorption phase (purge or regeneration phase) in order to enable effective purging of the carbon granules.

Standard PSA nitrogen generators, which are also called pressure swing adsorption generators for this reason, use a pressure level substantially corresponding to the ambient pressure during the regeneration cycle (desorption phase). Compared to such standard pressure swing adsorption generators, so-called vacuum pressure swing adsorption generators (VPSA technology) are of more complex configuration, their desorption process is thereby intensified, respectively shortened, by the fact that not only is the pressure reduced to the level of the ambient pressure but also a pressure approaching a vacuum pressure level, which is lower than the ambient pressure, is actively established in the proximity of the molecular sieve bed to be regenerated. To do so, it is then necessary to provide, in addition to the increased pressure level provided by the compressor, also a corresponding reduced pressure approaching a vacuum pressure level, for which a vacuum source is usually needed. Such a vacuum source can be in the form of a vacuum pump, for example.

As indicated above, the inventive solution makes use of the knowledge that the air factor of the gas separation system increases exponentially with increasing nitrogen purity on the one hand and, on the other, that in order to set a predefined inerting level, the compressor used in the inerting system has to run for a longer period of time the lower the difference is between the oxygen content prevailing in the spatial atmosphere of the enclosed room at that respective moment and the residual oxygen content in the nitrogenated gas mixture. It is hereby to be taken into account that the power consumption of the inerting system is virtually directly proportional to the length of time the drawdown process takes to render a room inert, whether when setting the room at a fixed residual oxygen content or when lowering to a new reduced level, since the compressor upstream of the gas separation system is digitally driven to its operating point at optimum efficiency.

It thus remains to be noted that—when a lower value of e.g. only 90% by volume is selected for the nitrogen purity—the inert gas system has to run for a relatively long period of time in order to set an inerting level. Should the nitrogen purity value be raised for example to 95% by volume, the difference between the oxygen content of the inerting level to be set and the residual oxygen content of the gas mixture provided at the outlet of the gas separation system likewise increases, which thereby reduces the amount of runtime the compressor needs to set an inerting level, and thus lowers the power consumption of the inerting system. However the circumstance of increasing the nitrogen purity at the outlet of the gas separation system inevitably also increases the air factor. The circumstance has a negative effect on the runtime of the compressor necessary to set an inerting level, respectively the power consumption of the inerting system. This negative effect prevails if the increase in the air factor due to increasing the nitrogen purity becomes appreciable.

Unlike with the usual systems known from the prior art where a fixed value is selected for the nitrogen purity of the gas separation system, the present invention is based on an inerting system in which, when the enclosed room is being rendered inert, the residual oxygen content provided at the outlet of the gas separation system and the nitrogen-enriched gas mixture is preferably automatically or selectively adjusted to the oxygen content prevailing at that respective moment in the spatial atmosphere of the enclosed room in order to thus set the nitrogen purity of the gas separation system to a value which is optimized in terms of the time required.

The phrase "time-optimized nitrogen purity value" as used herein refers to the nitrogen purity of the gas separation system, the residual oxygen content respectively, provided at the outlet of the gas separation system and the nitrogen-enriched gas mixture with which a defined inerting system, in which the volume of nitrogenated gas mixture able to be provided per unit of time is constant, assumes a minimum time period for lowering from a current oxygen content to a predefined oxygen content corresponding to a given inerting level.

Being able to set the volume of room air withdrawn from the room per unit of time and fed to the mixing chamber and/or the volume of fresh air added to the withdrawn portion of the room air per unit of time such that the difference between the pressure prevailing in the mixing chamber and the ambient atmospheric pressure does not exceed a predefined or predefinable upper threshold nor fall short of a predefined or predefinable lower threshold ensures that the initial gas mixture provided at the outlet of the mixing chamber is always in a defined state and optimally adapted to the gas separation system. The inventive solution in particular allows gas separation systems utilizing a plurality of nitrogen generators, whereby said plurality of nitrogen generators can also be based on differing gas separation technologies. Particularly ensured with the inventive solution is that the respective suction action of the plurality of nitrogen generators applicably employed will not interact with the other nitrogen generators provided. It is therefore readily feasible for the inventive solution to also be employed as a fire extinguishing system or a fire prevention measure in large-volume rooms, for instance warehouses, by using multiple and potentially different nitrogen generators therein for the gas separation, without the need for a costly, independent and regulated return line for each nitrogen generator from the protected room to the respective nitrogen generator. Accordingly, the adapted return method proposed by the inventive solution avoids increased expenditure in realizing the inventive inerting system.

The solution according to the invention in particular also lowers the operational costs required to produce the inerting effect in a simple to realize yet effective manner, in particular also in the case of relatively large-volume rooms such as warehouses, for example.

A further aspect of the invention provides for the upper pressure differential threshold to be 1.0 mbar, preferably 0.5 mbar, whereby the lower pressure differential threshold is preferably 0.0 mbar. Having the difference between the pressure prevailing in the mixing chamber and the external atmospheric pressure being within this indicated range always ensures that the respective suction action of the nitrogen generators employed (a constant suction action for a nitrogen generator which uses membrane technology for the gas separation or a pulsed suction action for a nitrogen generator which uses PSA or VPSA technology for the gas separation) will be a non-interacting action. Of course other values are also conceivable for the upper and/or lower threshold.

A further aspect of the invention provides for a control unit-regulated first fan mechanism in a first line system via which a portion of the spatial air contained within the enclosed room is withdrawn from the room in a manner regulated by said control unit and fed to the mixing chamber. Of further advantage is the providing of a second control unit-regulated fan mechanism in a second line system, via which fresh air is supplied to the mixing chamber in regulated fashion. The control unit should thereby be designed to control the first and/or second fan mechanism such that the volume of spatial air withdrawn from the room per unit of time is identical to the volume of the nitrogen-enriched gas mixture which is supplied to the spatial atmosphere of the enclosed room per unit of time. Providing the correspondingly controllable fan mechanisms can further maintain the difference between the pressure prevailing in the mixing chamber and the external ambient atmospheric pressure (within a certain control range) at a predefined or predefinable value in a simple to realize yet effective manner. This thus ensures that the initial gas mixture is provided to the respectively utilized nitrogen generators of the gas separation system in an optimally adapted state.

According to a further aspect of the invention, the volume of fresh air which is admixed with the spatial air withdrawn from the room in the mixing chamber per unit of time is selected such that the volume of spatial air withdrawn from the room per unit of time is identical to the volume of the nitrogen-enriched gas mixture which is piped into the spatial atmosphere of the enclosed room per unit of time. This thereby ensures that no excess or negative pressure will develop by introducing the nitrogenated gas mixture into the spatial atmosphere of the enclosed room or by the discharging/return of the spatial air from the enclosed room respectively.

To provide the initial gas mixture, a further aspect of the invention provides for a mixing section into which open the first line system, through which a portion of the air contained in the enclosed room is withdrawn from the room in regulated manner, and the second line system, by way of which fresh air is supplied in regulated manner, preferably by means of a Y-connector. This mixing section is either integrated into the mixing chamber or upstream of the mixing chamber. The mixing section serves to mix the spatial air withdrawn from the enclosed room with the fresh air as supplied and is configured—in order to ensure optimum mixing—so that a turbulent flow will occur in the mixing section. To this end, it is conceivable to correspondingly reduce the mixing section's effective flow cross-section such that a flow rate is set for the fresh air introduced into the mixing section and the return room air likewise introduced into the mixing section which is greater than the characteristic Reynolds number-dependent limiting velocity. Alternatively or additionally hereto, it is conceivable to provide spoiler elements in the mixing section in order to induce a turbulent flow in said mixing section.

In the latter embodiment cited in which a mixing section is integrated into the mixing chamber or arranged upstream of the mixing chamber for the turbulent mixing of the return room air and the supplied fresh air, a further aspect of the invention provides for the mixing section to exhibit a length sufficiently long enough to effect the most complete and even mixing of the return room air and supplied fresh air as possible. It is particularly preferred here for the mixing section to be of a length which is at least five times that of the mixing section's hydraulic diameter. The hydraulic diameter is a theoretical dimension for calculations related to tubes or channels of non-circular cross sections. This term then allows making calculations as with a round tube. It is the quotient of four times the flow cross section and the wetted perimeter (inner and outer as applicable) of a measurement cross section.

A further aspect of the invention provides for the gas separation system to comprise at least one and preferably a plurality of nitrogen generators each associated with a respective compressor connected to the mixing chamber by means of a line system. The residual oxygen content provided at the outlet of the nitrogen generator and the nitrogen-enriched gas mixture is adjustable for each nitrogen generator by means of the control unit. This realization is in particular suitable for protecting large volume areas such as for instance a warehouse.

A further aspect of the invention provides for the gas separation system's at least one nitrogen generator, at least one of the plurality of nitrogen generators respectively, to be configured as a vacuum pressure swing adsorption generator; i.e. in other words, one which functions according to VPSA technology. In the case of such a vacuum pressure swing adsorption generator, a line system is additionally provided between the mixing chamber and at least one inlet of the vacuum pressure swing adsorption generator. A controllable intermediate valve having a control connection to the control unit is active in this line system. The control unit can thus effect a direct controllable connection between the mixing chamber and the at least one inlet of the vacuum pressure swing adsorption generator. In conjunction with the method according to the invention, it is then provided that during the desorption phase of the vacuum pressure swing adsorption generator and for example a few seconds before the desorption phase is scheduled to end, for example five seconds before the scheduled end of the desorption phase, the intermediate valve in the line system connecting the mixing chamber and the nitrogen generator is brought from a closed position into an open position allowing passage so that the mixing chamber is directly connected to at least one inlet of the vacuum pressure swing adsorption generator prior to the end of the vacuum pressure swing adsorption generator's desorption phase.

A further aspect of the invention provides for the nitrogen generator of the gas separation system configured as a vacuum pressure swing adsorption generator to comprise at least one inlet, wherein the at least one inlet is selectively connected to the pressure side of a compressor or to the suction side of a vacuum source by means of a line system.

According to a further aspect of the invention with a nitrogen generator of the gas separation system configured as a vacuum pressure swing adsorption generator having at least one inlet, the at least one inlet of the nitrogen generator is connected to the suction side of the vacuum source during a desorption phase.

According to a further aspect of the invention with a nitrogen generator of the gas separation system configured as a vacuum pressure swing adsorption generator, at least one inlet of the nitrogen generator is selectively connected to the mixing chamber by means of a line system.

According to a further aspect of the invention with a nitrogen generator of the gas separation system configured as a vacuum pressure swing adsorption generator having at least one inlet, the at least one inlet of the nitrogen generator is connected to the mixing chamber by means of a line system to end a desorption phase of the nitrogen generator.

Since a negative pressure prevails at this inlet of the vacuum pressure swing adsorption generator during the desorption phase, nitrogen-enriched air from the mixing container is automatically provided into this inlet of the vacuum pressure swing adsorption generator prior to the end of the desorption phase, which leads for example to an adsorption bed containing carbon granules (CMS). A passive increase in pressure thus occurs in such an adsorption bed (CMS container) so that the desorption phase for this vacuum pressure swing adsorption generator can be passively ended without any additional expenditure of energy which saves time and energy compared to conventional solutions. Furthermore, when the pressure swing adsorption generator is then thereafter switched into a subsequent adsorption operation, such a passive increase in pressure in the adsorption bed (CMS container) enables the vacuum pressure swing adsorption generator to be switched into adsorption operation possible without the compressor load that would otherwise be necessary to regenerate a pressure in the area of the adsorption bed for the subsequent adsorption operation which is closer to the excess pressure subsequently created during the adsorption phase. What this realizes is that the compressor associated with the vacuum pressure swing adsorption generator can bring the molecular sieve bed back to the operating pressure in a shorter amount of time, whereby nitrogen is then in turn generated faster at the outlet of the vacuum pressure swing adsorption generator. Moreover, because air which is already nitrogenated flows from the mixing chamber toward the molecular sieve bed, the oxygen level during the subsequent adsorption phase already starts at a lower level. The appropriate design to the mixing chamber, for example preferably as a long mixing tube, in turn yields advantageous pressure fluctuation-compensating properties so that even the early end of a pressure equalization procedure in such a desorption phase of the vacuum pressure swing adsorption generator will not have any impact on for example any other of the plurality of nitrogen generators. In other words, ensuring the continued non-interacting operation of all the nitrogen generators employed.

With respect to the mixing chamber employed in the inventive solution, a further aspect of the invention provides for said mixing chamber to exhibit a volume which is dependent on the number of nitrogen generators used in the inerting system and/or on the principle on which the functioning of the least one nitrogen generator is based. The volume of the mixing chamber is to in particular be selected such that the respective suction action of the nitrogen generators employed will be a non-interacting action for all nitrogen generators.

In accordance with a further aspect of the invention, the mixing chamber is hereby further configured such that the maximum flow rate which can occur in the mixing chamber is less than 0.1 m/s on average. This is attained by suitably selecting the mixing chamber's hydraulic cross section.

A further aspect of the invention provides for the residual oxygen content of the nitrogen-enriched gas mixture, the nitrogen purity of the gas separation system respectively, to preferably be set automatically according to a predetermined characteristic curve.

A further aspect of the invention provides for such a characteristic curve to specify the time-optimized behavior of the residual oxygen content in the nitrogenated gas mixture in relation to the oxygen content in the spatial atmosphere of the enclosed room, according to which the inerting process can set a predefinable reduced oxygen content in the spatial atmosphere of the enclosed room compared to the normal ambient air in the shortest amount of time.

The phrase "time-optimized behavior of the residual oxygen content" refers to the time-optimized value of the residual oxygen content dependent on the oxygen content in the spatial atmosphere of the enclosed room. As indicated above, the time-optimized value of the residual oxygen content corresponds to the value of the residual oxygen content to be selected for the gas separation system such that the inerting method can set a predefinable oxygen content in the spatial atmosphere of the enclosed room which is reduced compared to the normal ambient air within the shortest amount of time.

The characteristic curve, according to which the residual oxygen content is set as a factor of the oxygen content prevailing at that respective moment in the spatial atmosphere of the enclosed room is predetermined (measured or calculated) for the gas separation system/inerting system.

Since one aspect of the inventive solution relates to the setting of the nitrogen purity of the gas separation system, or the residual oxygen content in the nitrogen-enriched gas mixture respectively, as a function of the oxygen content prevailing in the spatial atmosphere of the enclosed room at that respective moment and according to a further aspect of the inventive solution, the nitrogen purity of the gas separation system, the residual oxygen content in the nitrogen-enriched gas mixture respectively, is automatically set as a function of the oxygen content prevailing in the spatial atmosphere of the enclosed room at that respective moment so as to thereby be able to render the room inert at the lowest possible operating costs, a further aspect of the invention provides for either directly or indirectly measuring the current oxygen content in the spatial atmosphere of the enclosed room continuously or at predefined times and/or upon predefined events. A further aspect of the invention then further provides for setting the residual oxygen content in the nitrogen-enriched gas mixture to a predefined, time-optimized value continuously or at predefined times and/or upon predefined events. This predefined, time-optimized value is to correspond to a residual oxygen content at which the inerting method can lower the oxygen content in the spatial atmosphere of the enclosed room to a predefined drawdown value based on the respectively current oxygen content within the shortest amount of time possible.

A further aspect of the inventive solution provides not only for the nitrogen purity of the gas separation system to be changed as a function of the oxygen content prevailing at that respective moment in the spatial atmosphere of the enclosed room, but the oxygen content in the initial gas mixture is also changed as a function of the oxygen content prevailing in the enclosed room's spatial atmosphere at that respective moment. Doing so makes use of the knowledge that the air factor of the gas separation system can be lowered when the initial gas mixture supplied to the gas separation system exhibits a reduced oxygen content.

Thus, for the purpose of providing the initial gas mixture, one aspect of the invention provides for the regulated withdrawing of a portion of the ambient air from within the enclosed room and the regulated supplying of fresh air to the withdrawn portion of the room's air. So as to thereby prevent the pressure inside the enclosed room from changing by the supplying of nitrogen-enriched gas or by the drawing off a portion of its ambient air, the volume of fresh air admixed to the ambient air withdrawn from the room is selected such that the volume of ambient air withdrawn from the room per unit of time is identical to the volume of nitrogen-enriched gas mixture provided at the outlet of the gas separation system and piped into the spatial atmosphere of the enclosed room per unit of time.

The following will make reference to the accompanying drawings in describing exemplary embodiments of the inventive inerting system.

BRIEF DESCRIPTION OF THE FIGURES

Shown are.

DETAILED DESCRIPTION OF VARIOUS EMBODIMENTS

Figure 1:
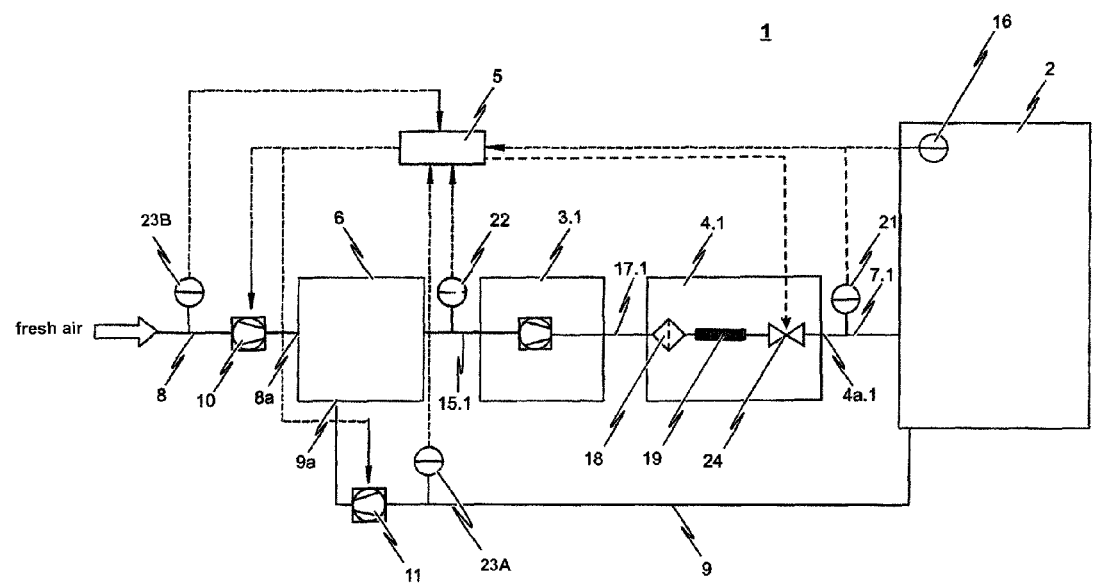
FIG. 1 a schematic view of an inerting system according to a first embodiment of the present invention.

FIG. 1 shows a first exemplary embodiment of an inerting system 1 according to the present invention in a schematic representation. The inerting system 1 depicted serves to set and maintain a predefinable inerting level in the spatial atmosphere of an enclosed room 2. The enclosed room 2 can be a warehouse, for example, in which the oxygen content of the room's ambient air is lowered to and maintained at a specific inerting level of e.g. 12% or 13% by volume of oxygen as a preventive fire protection measure.

The enclosed room 2 is selectively rendered inert automatically by means of a control unit 5. To this end, the inerting system 1 according to the embodiment depicted in FIG. 1 comprises a gas separation system consisting of a compressor 3.1 as well as a nitrogen generator 4.1. The compressor 3.1 serves to provide a compressed initial gas mixture to the nitrogen generator 4.1 comprised of at least the components of oxygen and nitrogen. To this end, the outlet of the compressor 3.1 is connected to the inlet of the nitrogen generator 4.1 by means of a line system 17.1 in order to supply the compressed initial gas mixture to the nitrogen generator 4.1. It is conceivable for the initial gas mixture at the outlet of the compressor 3.1 to be compressed to a pressure of e.g. 7.5 to 9.5 bar and preferably 8.8 bar.

The nitrogen generator 4.1 comprises at least one membrane module 19, for example a hollow fiber membrane module, through which the initial gas mixture provided by the compressor 3.1—after having passed through an appropriate filter 18—is pressed. The different components contained in the initial gas mixture (in particular oxygen and nitrogen) diffuse through the hollow fiber membrane of the membrane module 19 within said membrane module 19 at different rates according to their molecular structure. The gas separation is thereby based on the known operating principle of nitrogen only percolating through the hollow fiber membrane very slowly at a low diffusion rate and thereby concentrating as it passes through the hollow fiber membrane of the membrane module 19. A nitrogen-enriched gas mixture is thus provided at the outlet 4a.1 of the nitrogen generator 4.1. This nitrogen-enriched gas mixture is—as is also the case with the initial gas mixture supplied at the inlet of the nitrogen generator 4.1—in compressed form, wherein passing through the at least one membrane module 19 of the nitrogen generator 4.1 does, however, lead to a drop in pressure of e.g. 1.5 to 2.5 bar.

Although not explicitly depicted in FIG. 1, the oxygen-rich gas mixture separated out in the nitrogen generator 4.1 is concentrated and discharged to the surroundings at atmospheric pressure.

The nitrogen-enriched gas mixture provided at the outlet 4a.1 of the nitrogen generator 4.1 is fed to the enclosed room 2 through a supply line 7.1 in order to lower the oxygen content in the spatial atmosphere of the enclosed room 2, respectively to maintain a previously-set drawdown level in room 2, by adding nitrogen-enriched gas.

A suitable pressure relief can be provided so that the pressure within the enclosed room 2 does not change when the nitrogenated gas mixture is supplied. This can be realized for example as independently opening/closing pressure relief valves (not shown in FIG. 1). On the other hand, it is however also conceivable for the discharged volume of ambient air to be supplied to a mixing chamber 6 via a return line system 9 for the purpose of pressure relief when rendering room 2 inert.

The ambient air discharged from the enclosed room 2 is supplied to the mixing chamber 6 via a first inlet 9a of the return line 9. The mixing chamber 6 further comprises a second inlet 8a which opens into a supply line system 8 for supplying fresh air to the mixing chamber 6. The mixing chamber 6 provides the initial gas mixture, which has been compressed by compressor 3 and from which at least a portion of the oxygen is separated off in the gas separation system (nitrogen generator 4.1). For this reason, the outlet of the mixing chamber 6 is connected to the inlet of the compressor 3.1 by an appropriate line system 15.1.

In detail, a first fan mechanism 11 controllable by control unit 5 is provided in the return line system 9 and a second fan mechanism 10, likewise controllable by control unit 5, is provided in the fresh air supply line system 8. Doing so thus ensures that by appropriately actuating the respective fan mechanisms 10, 11, the amount of fresh air mixed with the ambient air withdrawn from room 2 will be selected such that the volume of air withdrawn from room 2 per unit of time is identical to the volume of nitrogen-enriched gas mixture provided at the outlet 4a.1 of the nitrogen generator 4.1 as piped into the spatial atmosphere of the enclosed room 2 per unit of time.

The inerting system 1 according to the embodiment of the present invention depicted schematically in FIG. 1 is characterized by the above-cited control unit 5 being connected to the correspondingly controllable components of the inerting system 1 and designed so as to automatically control the nitrogen generator 4.1, the gas separation system respectively, such that the nitrogenated gas mixture provided at the outlet 4a.1 of the gas separation system has a residual oxygen content which is dependent on the oxygen content prevailing in the spatial atmosphere of the enclosed room 2 at that respective moment. In particular, the nitrogen generator 4.1 of the depicted preferred realization of the inventive inerting system 1 is controlled by means of the control unit 5 such that depending on the oxygen content in the spatial atmosphere of the enclosed room 2 as measured by means of an oxygen measuring system 16, the nitrogen-enriched gas mixture will have a residual oxygen content of between 10.00% to 0.01% by volume, wherein the residual oxygen content of the nitrogen-enriched gas mixture decreases as the oxygen content in the spatial atmosphere of the enclosed room 2 decreases.

To this end, the inventive inerting system 1 further comprises, in addition to the above-mentioned oxygen measuring system 16 for measuring or determining the current oxygen content in the spatial atmosphere of the enclosed room 2, a residual oxygen content measuring system 21 for measuring the residual oxygen content in the nitrogenated gas mixture provided at the outlet 4a.1 of the nitrogen generator 4.1, respectively for determining the nitrogen purity of the gas mixture provided at the outlet 4a.1 of the nitrogen generator 4.1. Both measuring systems 16, 21 are correspondingly connected to the control unit 5.

Figure 2:
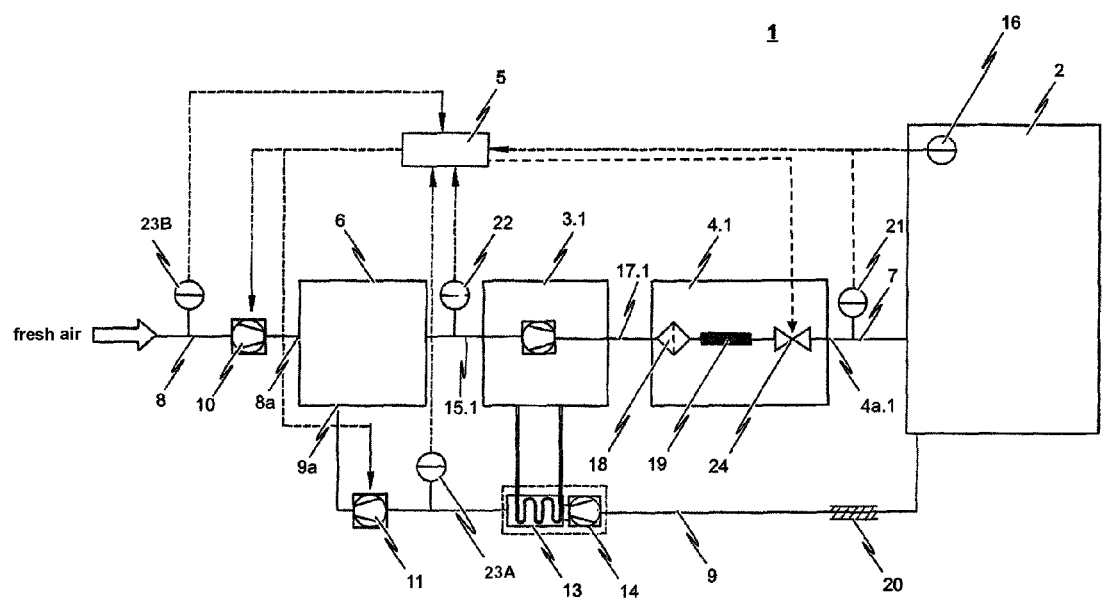
FIG. 2 a schematic view of an inerting system according to a second embodiment of the present invention.

FIG. 2 shows a schematic view of an inerting system 1 according to a second embodiment of the present invention. The inerting system 1 according to the second embodiment is particularly suited to setting and maintaining a predefined inerting level in an air-conditioned room such as a cold storage room or a refrigerated warehouse, for example, as economically as possible. The design and functioning of the inerting system 1 according to the embodiment depicted in FIG. 2 substantially corresponds to the design and functioning of the inerting system described above with reference to FIG. 1 so that to avoid repetition, the following will only address the differences.

To enable the most economic inerting of an air-conditioned room 2 possible, it is preferable to provide a heat exchanger system 13 in the return line system 9 between the room 2 and the mixing chamber 6, as depicted in FIG. 2. It is further advantageous for the return line system 9 to be at least partly sheathed in an appropriate thermal insulation 20—as indicated in FIG. 2—so as to prevent freezing of the return line system 9 when the chilled ambient air withdrawn from the enclosed room 2 is fed to the heat exchanger system 13 via the return line system 9 before said air is then piped into the mixing chamber 6. The heat exchanger system 13 can comprise a booster fan 14 as needed so that the ambient air can be withdrawn from the spatial atmosphere of the enclosed room 2 without a drop in pressure.

The heat exchanger system 13 thereby serves to utilize at least a portion of the waste heat resulting from the operation of the compressor 3.1 in order to accordingly warm the cooled ambient air withdrawn from the room. Different systems are used for the heat exchanger system 13, such as for example a fin coil heat exchanger which transfers at least a portion of the thermal energy of the exhaust air from compressor 3.1 to the air withdrawn from the room by means of a heat-exchange medium such as e.g. water so as to raise the temperature of the withdrawn ambient air to a moderate temperature of for example 20° C., which is advantageous in terms of the functioning and the efficiency of the nitrogen generator 4.1.

After the ambient air withdrawn from the enclosed room 2 has filtered through the heat exchanger system 13, it is fed to the mixing chamber 6 via a first inlet 9a of the return line system 9. The mixing chamber 6 further comprises a second inlet 8a, into which a supply line system 8 opens for supplying fresh air to the mixing chamber 6. The mixing chamber 6 provides the initial gas mixture, compressed by compressor 3.1 and from which at least a portion of the oxygen has been separated off in the gas separation system (nitrogen generator 4.1). For this reason, the outlet of the mixing chamber 6 is connected to the inlet of the compressor 3.1 by means of an appropriate line system 15.

Figure 3:
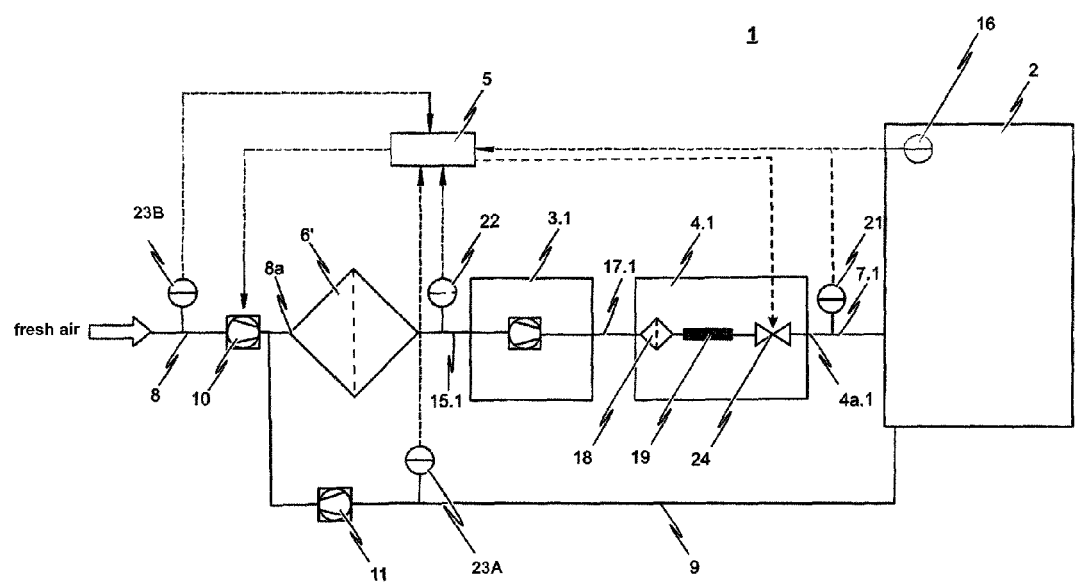
FIG. 3 a schematic view of an inerting system according to a third embodiment of the present invention.

FIG. 3 shows a schematic view of an inerting system 1 according to a third embodiment of the present invention. The design and functioning of the inerting system 1 according to the embodiment depicted in FIG. 3 substantially corresponds to the design and functioning of the inerting system described above with reference to FIG. 1 so that to avoid repetition, the following will only address the differences.

As FIG. 3 shows, the mixing chamber of the embodiment depicted therein is realized as a filter 6'. The mixing chamber realized as a filter 6' thus fulfills two functions: on the one hand, it serves to provide the initial gas mixture, and does so by mixing the fresh air supplied by the fresh air supply line system with the ambient air withdrawn from room 2 supplied by the return line system 9. On the other hand, the mixing chamber realized as filter 6' serves to filter the provided initial gas mixture prior to it being compressed by means of compressor 3.1. This thus dispenses with the need for an additional filter at the inlet of compressor 3.1.

A fourth exemplary embodiment of the inventive inerting system 1 will be described below making reference to the representation provided in FIG. 4.

Figure 4:
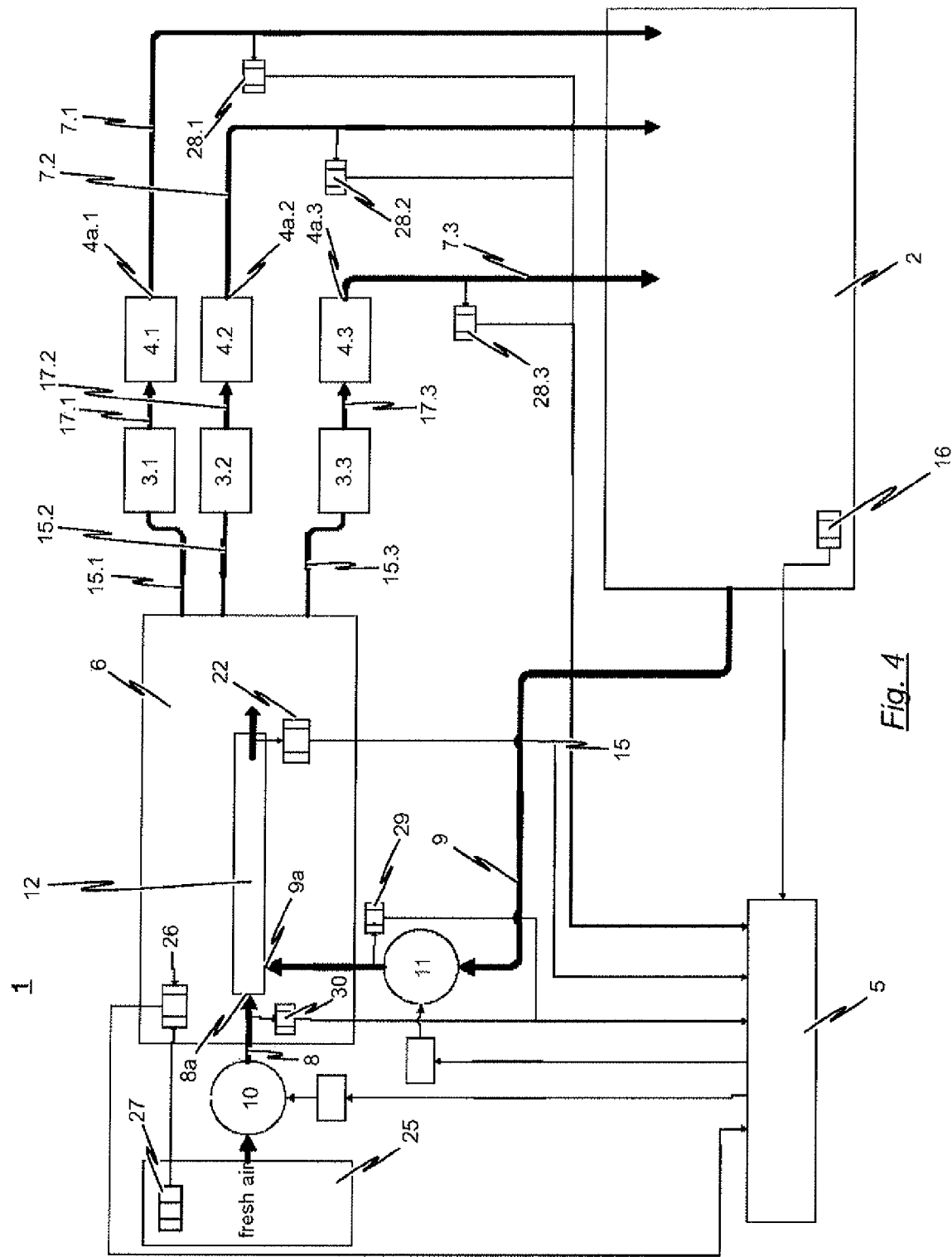
FIG. 4 a schematic view of an inerting system according to a fourth embodiment of the present invention.

The design and functioning of the inerting system 1 according to the fourth embodiment is essentially identical to the embodiment described above with reference to the FIG. 1 depiction, albeit the embodiment according to FIG. 4 makes use of a plurality of nitrogen generators 4.1, 4.2 and 4.3 connected in parallel. Each nitrogen generator 4.1, 4.2, 4.3 is respectively associated with a compressor 3.1, 3.2, 3.3 which is connected to the mixing chamber 6 by means of a corresponding line system 15.1, 15.2, 15.3 so as to suction off the necessary initial gas mixture from the mixing chamber 6 for the associated nitrogen generator 4.1, 4.2, 4.3 and to compress it to the pressure value required for the optimum operation of the respective nitrogen generator 4.1, 4.2, 4.3. Each nitrogen generator 4.1, 4.2, 4.3 utilized in the inerting system 1 according to the embodiment depicted in FIG. 4 is connected to the enclosed room 2 by means of a corresponding supply line 7.1, 7.2, 7.3. Hence, the gas separation system depicted in the FIG. 4 embodiment is formed by the "nitrogen generator 4.1, 4.2, 4.3" components and the associated "compressor 3.1, 3.2, 3.3" components.

As with the embodiments of the inventive solution described above with reference to the representations provided in FIGS. 1 to 3, the embodiment according to FIG. 4 also makes use of a return line 9. As depicted, a first fan mechanism 11 is pro-vided in the return line 9 which can be correspondingly controlled by the control unit 5 such that a portion of the ambient air can be withdrawn from the enclosed room 2 in regulated manner and fed to the mixing chamber 6. A fresh air supply line 8 is further provided in the embodiment depicted in FIG. 4 to supply fresh air from an external area 25 to the mixing chamber 6 in regulated manner. To this end, a second fan mechanism 10 controllable by the control unit 5 is provided in the fresh air supply line 8.

As with the embodiments of the inventive inerting system 1 described above, a mixing chamber 6 is also provided in the embodiment depicted in FIG. 4 in order to provide an initial gas mixture comprised of oxygen, nitrogen and other components as applicable. The initial gas mixture provided in the mixing chamber 6 is supplied to the respective compressors 3.1, 3.2, 3.3 of the gas separation system through the corresponding line systems 15.1, 15.2, 15.3.

So that the initial gas mixture provided by the mixing chamber 6 is in an optimum state for the respective nitrogen generators 4.1, 4.2, 4.3 employed, the embodiment of the inventive inerting system 1 depicted in FIG. 4 provides for a mixing section 12 to be integrated in the mixing chamber 6, although it is not mandatory for said mixing section 12 to be integrated into the mixing chamber 6, it can also be provided upstream of the mixing chamber 6.

Specifically, in the embodiment shown in FIG. 4, the return line 9 on the one hand and the fresh air supply line 8 on the other open into mixing section 12. Although not explicitly shown in FIG. 4, it is hereby preferred for the end 9a of the return line 9 and the end 8a of the fresh air supply line 8 to open into mixing section 12 by means of a Y-connector preferably situated at the upstream end portion of said mixing section 12.

The mixing section 12 serves in the optimum mixing of the fresh air supplied through supply line 8 and the room air supplied through return line 9. To this end, it is preferred for the mixing section 12 to be dimensioned so that a turbulent flow will be produced within the mixing section 12. This can for example be achieved by reducing the effective flow cross section of mixing section 12 so as to have a flow rate be set in the mixing section 12 which is greater than the limiting velocity to produce a turbulent flow characteristic of and dependent on the corresponding Reynolds number. Alternatively or additionally hereto, it is equally conceivable to provide appropriate spoiler elements in the mixing section 12 to induce a turbulent flow in said mixing section 12.

As can be noted from the schematic representation provided in FIG. 4, the mixing section 12 exhibits a length sufficiently long enough to effect the most optimally thorough mixing of the fresh and room air supplied from the upstream situated end portion to the downstream situated end portion of the mixing section. Experimental tests have shown that it is advantageous for the mixing section 12 to be of a length which is at least five times the effective flow cross section of the mixing section 12.

The ambient air return from the enclosed room 2 through return line 9 and thoroughly mixed with the supplied fresh air in the mixing section 12 is piped into the mixing chamber 6 at the downstream end portion of the mixing section 12. In contrast to the mixing section 12, the mixing chamber 6 exhibits a clearly larger effective flow cross section in order to be able to effect flow abatement. It is particularly necessary for the initial gas mixture ultimately provided in the mixing chamber 6 to always be in an optimized state for the nitrogen generators 4.1, 4.2, 4.3 employed. This in particular means that the difference between the pressure prevailing in the mixing chamber 6 and the external atmospheric pressure does not exceed a predefined or predefinable upper threshold nor fall short of a predefined or predefinable lower threshold. In addition, the maximum flow rate which can occur in the mixing chamber should be less than 0.1 m/s on average.

In order to be able to comply with these conditions in terms of the initial gas mixture, the embodiment of the inventive inerting system 1 depicted in FIG. 4 provides for a pressure sensor 26 inside the mixing chamber 6. Said pressure sensor 26 measures the pressure prevailing inside the mixing chamber 6 continuously or at predetermined times and/or upon predetermined events and furnishes it to the control unit 5. The control unit 5 compares the pressure value measured in the mixing chamber 6 to the pressure value of the external atmosphere and accordingly regulates the first and/or second fan mechanism 11, 10 based on this comparison of the two pressure values in order to ensure that the difference between the pressure prevailing in the mixing chamber 6 and the external atmospheric pressure does not exceed the predefined or predefinable upper threshold nor fall short of the predefined or predefinable lower threshold. For the sake of completeness, it is pointed out that a corresponding pressure sensor 27 is provided in the external area 25 to measure the pressure in the external area 25 continuously or at predetermined times and/or upon predetermined events and furnish it to the control unit 5. Alternatively, the pressure sensor 26 could also be a differential pressure sensor.

In the embodiment of the inventive inerting system 1 depicted in FIG. 4, the control unit 5 is designed so as to control the first fan mechanism 11 and/or the second fan mechanism 10 such that the difference between the pressure prevailing in the mixing chamber 6 and the external atmospheric pressure amounts to a maximum of 0.1 mbar and preferably a maximum of 0.5 mbar.

As can be noted from the FIG. 4 depiction, a total of three nitrogen generators 4.1, 4.2, 4.3 are used for the purpose of gas separation. It is hereby conceivable for some or all of the nitrogen generators 4.1, 4.2, 4.3 to be based on different gas separation techniques. It is thus for example conceivable for the first nitrogen generator 4.1 to use a separating membrane for the gas separation. The compressor 3.1 associated with the first nitrogen generator 4.1 is then to be correspondingly adjusted to the applicable pressure to be established at the inlet of said nitrogen generator 4.1 (e.g. 13 bar). The second nitrogen generator 4.2 can then for example make use of PSA technology for the purpose of the gas separation. The associated compressor 3.2 is to be accordingly configured in this case, whereby it would have to supply an initial pressure of e.g. 8 bar. The further nitrogen generator 4.3 utilized in the embodiment according to FIG. 4 can be a nitrogen generator based, for example, on VPSA technology. The associated compressor 3.3 is then to be configured such that low pressure is provided at its outlet.

Thus, the gas separation system depicted in the FIG. 4 embodiment makes use of a combination of different nitrogen generators 4.1, 4.2, 4.3, wherein the compressors 3.1, 3.2, 3.3 respectively associated with the nitrogen generators 4.1, 4.2, 4.3 are adapted to each nitrogen generator's respective operating mode.

In order to be able to ensure the optimum functioning of the gas separation system, the mixing chamber 6 needs to be of a large enough design so that no inadmissible pressure fluctuations will occur during the operation of the individual compressors 3.1, 3.2, 3.3 and in particular there will be no interactive impact on the nitrogen generators 4.1, 4.2, 4.3 employed. As previously noted, the maximum value of permissible pressure fluctuations is preferably 1.0 mbar and even more preferred is 0.5 mbar.

Although not explicitly depicted in FIG. 4, it is preferred for the respective line systems 15.1, 15.2, 15.3 which connect the respective compressors 3.1, 3.2, 3.3 to the mixing chamber 6 to open into the mixing chamber 6 by way of appropriately dimensioned suction openings so as to be able to prevent any direct dynamic influencing of the intake air flow. Similarly, the suction openings should be positioned so as to be accordingly distanced from one another.

The use of the special mixing chamber 6, mixing section 12 respectively, as previously described is not limited to the embodiment of the inventive inerting system 1 depicted in FIG. 4. Rather, it is quite conceivable to also use the mixing chamber 6, mixing section 12 respectively, from FIG. 4 in the embodiments shown in FIGS. 1 to 3 in order to optimize the operation of the inerting system 1.

As with the above-described embodiments of the inventive inerting system, the inerting system 1 according to the FIG. 4 depiction also provides for measuring the oxygen content of the initial gas mixture provided in mixing chamber 6 continuously or at predetermined times and/or upon predetermined events and feeding the measured value to the control unit 5. It is hereto advantageous for a corresponding oxygen sensor 22 to be arranged at the downstream end portion of the mixing section 12.

Providing an oxygen measuring system in return line 9 is of further advantage. However, in place of an oxygen measuring system in the return line 9, the oxygen content of the ambient air within the enclosed room 2 can also be measured. To this end, a an oxygen measuring system 16 correspondingly provided in room 2 is used in the embodiment depicted in FIG. 4.

In the embodiment depicted in FIG. 4, in which a plurality of nitrogen generators 4.1, 4.2, 4.3 are used for the gas separation, it is preferable to measure the respective flow rates of the gas flows piped from the respective outlets 4a.1, 4a.2, 4a.3 of the nitrogen generators 4.1, 4.2, 4.3 to the enclosed room 2. As shown, the corresponding sensors 28.1, 28.2, 28.3 are used in the embodiment depicted in FIG. 4 for this purpose.

Of further advantage is measuring the flow rate of the return line 9 by means of a volumetric flow sensor 29, the flow rate of the fresh air supply 8 by means of a volumetric flow sensor 30 and the flows rates of the initial gas mixtures supplied to the individual compressors 3.1, 3.2, 3.3 as applicable. All the measured values are fed to control unit 5, which then correspondingly actuates the respective controllable components of the inerting system 1 so as to keep the pressure difference between the mixing chamber 6 and the external area 25 within the permissible control range.

The embodiment depicted in FIG. 4 moreover provides for the control unit 5 being able to set the residual oxygen content at each nitrogen generator 4.1, 4.2, 4.3.

Figure 10:
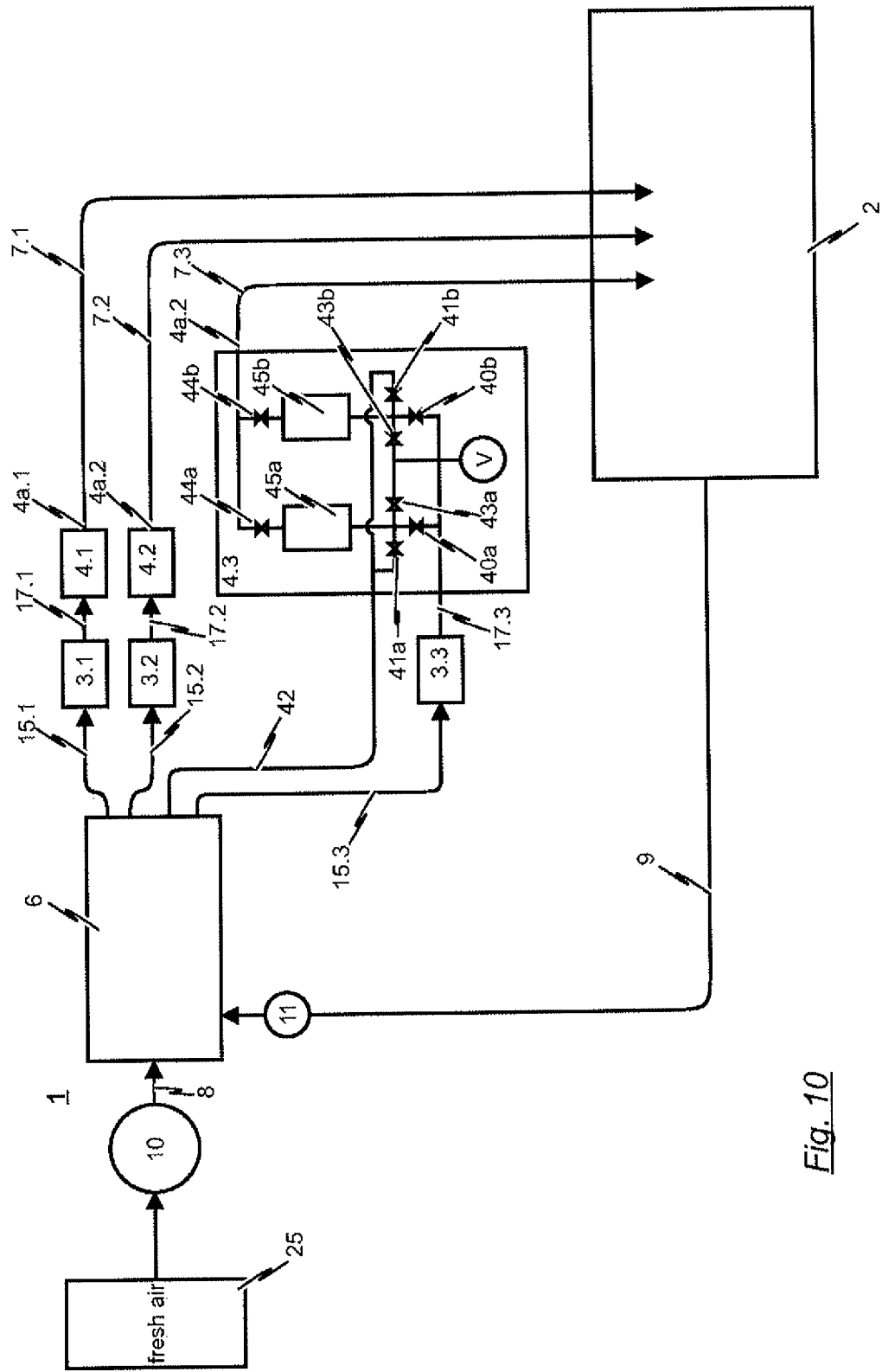
FIG. 10 a schematic view of an inerting system according to a sixth embodiment of the present invention.

In a preferred realization of the inerting system 1 depicted schematically in FIGS. 4, 10 to 11 VPSA nitrogen generators and 2 to 4 membrane nitrogen generators are used in parallel, whereby the mixing chamber has a surface area of 10 m×4.3 m.

As set forth in detail below with reference being made to the graphical depictions according to FIGS. 5 to 7, appropriately setting the nitrogen purity of the nitrogen generator(s) 4.1, 4.2, 4.3 utilized, respectively appropriately setting the residual oxygen content in the nitrogenated gas mixture provided at the respective outlet 4a.1, 4a.2, 4a.3 of the gas—separation system, enables a predefined draw-down level to be set in the spatial atmosphere of the enclosed room in a manner which is optimized in terms of the time required. Accordingly, the inventive solution thereby provides for the nitrogen purity of the nitrogen generator(s) 4.1, 4.2, 4.3 utilized to be set and adjusted as a function of the oxygen content prevailing in the spatial atmosphere of the enclosed room 2 at that respective moment when said enclosed room 2 is being rendered inert.

The nitrogen purity can be changed by varying the dwell time of the initial gas mixture in the at least one membrane module 19 of the nitrogen generator(s) 4.1, 4.2, 4.3 employed. It is hereby conceivable, for example, to regulate the flow through the membrane module 19 and the backpressure by means of a suitable control valve 24 at the outlet of membrane module 19. A high pressure on the membrane and a long dwell time (lower flow rate) result in a high nitrogen purity at the respective outlet 4*a*.1, 4*a*.2, 4*a*.3 of the respectively employed nitrogen generator 4.1, 4.2, 4.3.

A time-optimized value is preferably selected for the respective nitrogen purity which enables the inerting system to set and maintain a predefined inerting level in the enclosed room 2 within the shortest amount of time possible. By making use of the appropriate time-optimized values for the nitrogen purity when setting and maintaining a predefined inerting level in the spatial atmosphere of the enclosed room, it is possible to reduce the time required for the drawdown process (whether for maintaining a fixed residual oxygen content or when lowering to a new drawdown level) and thus also reduce the energy the inerting system requires since the compressor 3.1, 3.2, 3.3 is digitally driven (in/out) to its operating point at optimized efficiency.

The inerting system 1 according to the embodiment depicted in FIG. 1, 2, 3 or 4 is further characterized by the mixing chamber 6 providing the gas separation system consisting of the compressor 3.1 and the nitrogen generator 4.1, the gas separation system consisting of compressors 3.1, 3.2, 3.3 and nitrogen generators 4.1, 4.2, 4.3 respectively, with an initial gas mixture which can have a lower oxygen content than the oxygen content of normal ambient air (i.e. approx. 21% by volume). Specifically, the above-cited return line system 9 is provided for this purpose, same supplying at least a portion of the ambient air of the enclosed room 2 to the mixing chamber 6 through fan mechanism 11 in a manner regulated by control unit 5. Thus, when the oxygen content has already been reduced in enclosed room 2, the return line system 9 will supply the mixing chamber 6 with a gas mixture which is nitrogen-enriched compared to the normal ambient air. This portion of the room's air is mixed with supply air in mixing chamber 6 in order to provide the compressor 3.1 and the nitrogen generator 4.1, compressors 3.1, 3.2, 3.3 and nitrogen generators 4.1, 4.2, 4.3 respectively, with the required volume of initial gas mixture. Since the oxygen content of the initial gas mixture influences the air factor of the gas separation system, the nitrogen generators 4.1, 4.2, 4.3 as employed respectively, and thus also influences the time-optimized value for the nitrogen purity of the nitrogen generators 4.1, 4.2, 4.3 as employed, the embodiment of the inventive inerting system 1 depicted in FIG. 1 provides for an oxygen measuring system 22 in the line system 15.1 between the outlet of the mixing chamber 6 and the inlet of the compressor 3.1 to measure the oxygen content in the output gas mixture. It is hereto furthermore optionally conceivable to provide corresponding oxygen measuring systems 23A, 23B in the return line system 9, the fresh air supply line 8 respectively, in order to measure the oxygen content in the supply air and in the nitrogen-enriched room air continuously or at predefined times and/or upon predefined events. On the basis of the measured readings, the composition of the initial gas mixture (in particular in terms of its oxygen content) can be appropriately influenced by the appropriate actuating of fan mechanisms 10 and/or 11.

Figure 5:
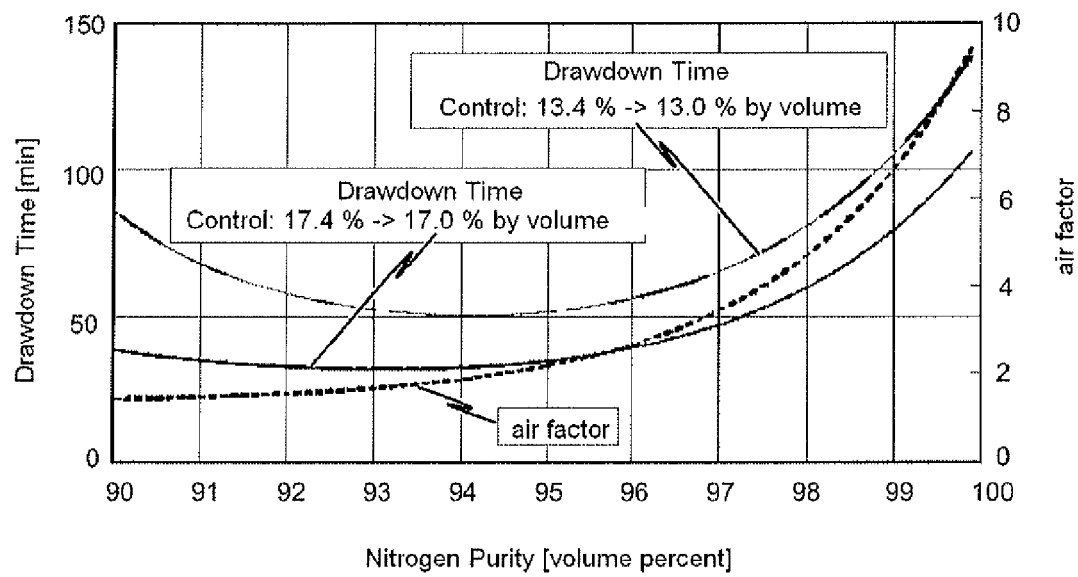
FIG. 5 a graphical illustration of the air factor in relation to the nitrogen purity with an inerting system according to FIG. 1, FIG. 2, FIG. 3 or FIG. 4, as well as a graphical illustration of the drawdown time in relation to the nitrogen purity, and specifically the lowering of the oxygen content from its original 17.4% by volume to 17.0% by volume as well as a lowering of the oxygen content from its original 13.4% by volume to 13.0% by volume.
Figure 6:
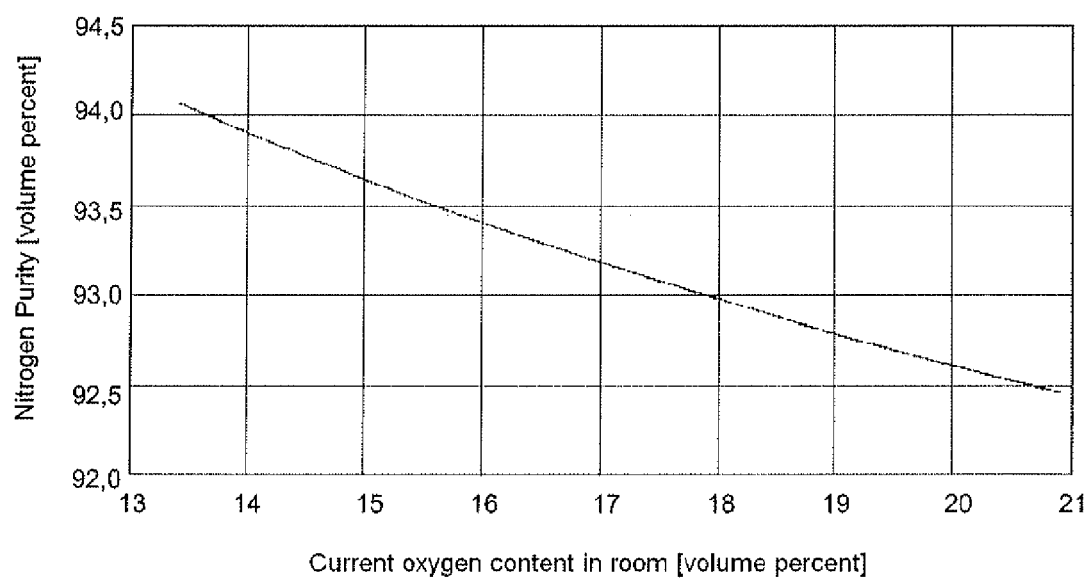
FIG. 6 a graphical illustration of the time-optimized nitrogen purity in relation to the current oxygen content in the spatial atmosphere of the enclosed room with the inerting system according to FIG. 1, FIG. 2, FIG. 3 or FIG. 4.
Figure 7:
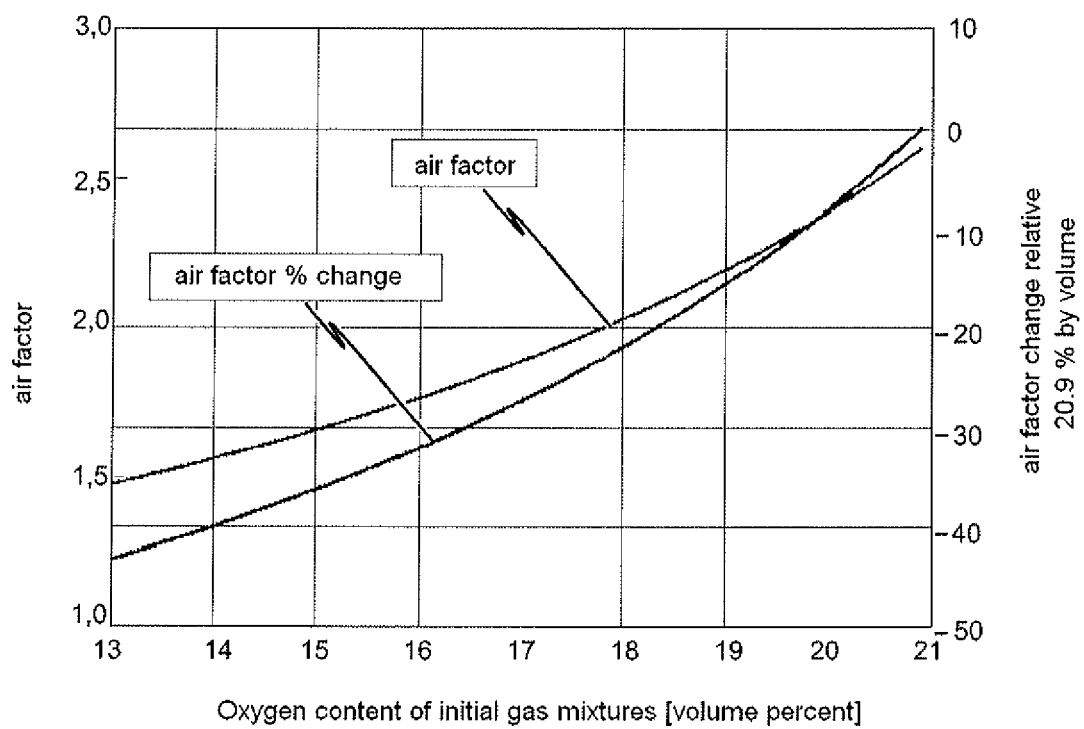
FIG. 7 a graphical illustration of the air factor of the gas separation system with the inerting system according to FIG. 1, FIG. 2, FIG. 3 or FIG. 4 compared to the oxygen content of the initial gas mixture supplied to the gas separation system in order to separate at least a portion of the oxygen from the initial gas mixture and thereby provide a nitrogenated gas mixture at the outlet of the gas separation system.

The following will draw reference to the graphical representations provided in FIGS. 5 to 7 in describing how the inventive solution of the inerting system 1 depicted schematically in FIGS. 1 to 4 functions. With respect to the inerting system 1 depicted schematically in FIGS. 1 to 4, the assumption is to be made that the enclosed room 2 has a spatial volume of 1000 cubic meters. It is further to be assumed that the inerting system 1 is designed so as to provide a maximum total of 48 cubic meters nitrogenated gas per hour at the outlet of the gas separation system.

FIG. 5 represents a graphical depiction of the air factor for the gas separation system used in the inerting system 1 schematically depicted in FIGS. 1 to 4 at different nitrogen purities. It is to be accordingly noted that the air factor increases exponentially as the residual oxygen content of the nitrogen-enriched gas mixture provided at the outlet of the gas separation system decreases. Specifically, the air factor at a residual oxygen content of 10% by volume (nitrogen purity: 90%) is approximately 1.5, which means that a volume of 0.67 cubic meters of nitrogen-enriched gas mixture can be provided at the outlet of the gas separation system per cubic meter of initial gas mixture. This ratio declines with increasing nitrogen purity as can be noted from the FIG. 5 graph.

FIG. 5 additionally depicts the air factor trend according to which the regulating drawdown time reacts with increasing nitrogen purity at different nitrogen purities. It is specifically depicted on the one hand how long the compressor or compressors 3.1, 3.2, 3.3 need to run in order to lower the oxygen content in the spatial atmosphere of the enclosed room 2 from its original 17.4% by volume to 17.0% by volume. How long the compressor or compressors 3.1, 3.2, 3.3 need to run in order to lower the oxygen content in the spatial atmosphere of the enclosed room 2 from its original 13.4% by volume to 13.0% by volume with the inerting system 1 according to FIGS. 1 to 4 is then also depicted on the other hand.

The comparison of the two drawdown times (drawdown time control of 17.4%→17.0% by volume and drawdown time control of 13.4%→13.0% by volume) shows that to set and maintain an inerting level of 17.0% by volume, the runtime of compressor 3.1, compressors 3.1, 3.2, 3.3 respectively, can be minimized when a nitrogen purity of approx. 93.3% by volume is set at the gas separation system. However, to set and maintain an inerting level of 13% by volume oxygen content, the time-optimized purity will then be about 94.1% nitrogen by volume. Hence the drawdown time or the runtime of compressor 3.1 or compressors 3.1, 3.2, 3.3 respectively for setting a predefined inerting level in the spatial atmosphere of enclosed room 2 is dependent upon the nitrogen purity set for the gas separation system, or respectively dependent upon the residual oxygen content of the nitrogen-enriched gas mixture provided at the outlet of the gas separation system as set by means of the nitrogen generators 4.1, 4.2, 4.3 employed.

The respective minima of the drawdown time relative the nitrogen purity is referred to in the following as "time-optimized nitrogen purity." The FIG. 6 depiction shows the optimized nitrogen purity for the inerting system 1 according to FIGS. 1 to 4. Specifically indicated is the time-optimized purity which applies to the gas separation system of the inerting system 1 according to FIGS. 1 to 4 for the different oxygen concentrations in the spatial atmosphere of enclosed room 2.

It can be directly seen from the characteristic curve depicted in FIG. 6 that the nitrogen generators 4.1, 4.2, 4.3 employed are to be set such that the residual oxygen content in the gas mixture provided at the outlet of the gas separation system decreases with decreasing oxygen content in the spatial atmosphere of enclosed room 2. When the employed nitrogen generator is accordingly operated pursuant the nitrogen purity characteristic curve depicted in FIG. 6 when rendering enclosed room 2 inert, it is possible to set and maintain the predefined inerting level in the spatial atmosphere of enclosed room 2 at the shortest possible runtime of the compressors 3.1, 3.2, 3.3 as employed and thus at the lowest possible expenditure of energy.

FIG. 7 provides a graphical depiction of the influence the oxygen content in the initial gas mixture has on the gas separation system air factor. According thereto, at a fixed nitrogen purity for the gas separation system, the air factor drops as the oxygen content is reduced in the initial gas mixture. As noted above, the return supply line 9 is provided in the inerting system 1 according to the schematic depiction of e.g. FIG. 1, by means of which a portion of the room's ambient air (already nitrogenated where applicable) is fed to the mixing chamber 6 in regulated manner so as to thus reduce the oxygen content of the initial gas mixture from its original 21% by volume (the oxygen content of normal ambient air). This recirculating of the room's already nitrogenated air can thus further reduce the air factor of the gas separation system so that the efficiency of the gas separation system will be increased and the energy required to set and maintain a predefined inerting level can be even further reduced.

The characteristic curve depicted in FIG. 7 can preferably be combined with the method graphically represented by FIGS. 5 and 6 such that an optimized supply of nitrogen is provided for each initial gas mixture oxygen concentration and in room 2.

Figure 8:
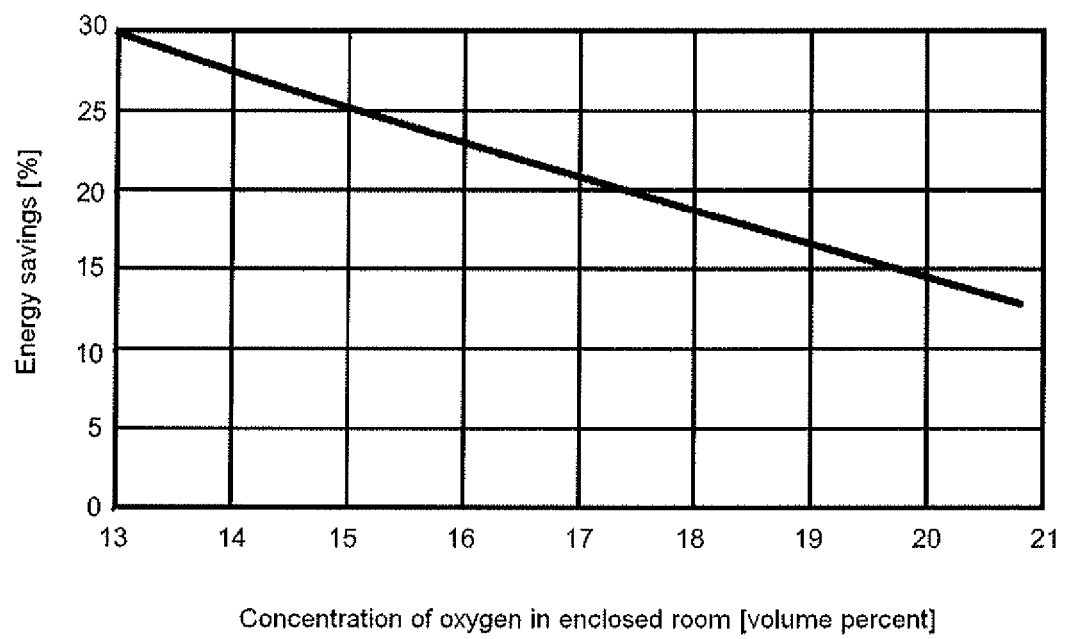
FIG. 8 a graphical illustration of the energy savings which can be achieved by lowering the oxygen content of the enclosed room's spatial atmosphere by means of the inventive solution.

FIG. 8 depicts—for a calculated application—the energy savings which can be achieved (in %) with the oxygen content set in the spatial atmosphere of an enclosed room when the inventive solution lowers the oxygen concentration in the spatial atmosphere of the enclosed room. The case depicted here is one in which the time-optimized nitrogen purity was selected for the nitrogen generator's nitrogen purity during the inerting of the room on the one hand and, on the other, the previously nitrogenated room air was recirculated so as to thereby further reduce the nitrogen generator's air factor and increase its efficiency.

A fifth exemplary embodiment of the inventive inerting system 1 will be described in the following with reference being made to the depiction provided in FIG. 9.

The design and functioning of the inerting system 1 according to the fifth embodiment is essentially identical to that of the fourth embodiment described above with reference to FIG. 4. The nitrogen generator 4.3 of the plurality of nitrogen generators 4.1, 4.2. and 4.3 connected in parallel is designed in this fifth embodiment as a vacuum pressure swing adsorption generator based on VPSA technology. As previously described referencing the fourth embodiment according to FIG. 4, the vacuum pressure swing adsorption generator 4.3 according to the fifth embodiment is also connected by means of a line system 17.3 to an associated compressor 3.3 which in turn has a connection to the mixing chamber 6 via a line system 15.3. An intermediate valve is additionally looped into the line system 17.3 between the compressor 3.3 and the vacuum pressure swing adsorption generator 4.3 which is designed so as to be controllable and has a connection to the control unit 5 for this purpose. Additionally to the connection made between the mixing chamber 6 and the vacuum pressure swing adsorption generator 4.3 through a compressor 3.3, a further line system 42 is provided between the mixing chamber 6 and the generator 4.3. An intermediate valve is again looped into this additional line system 42 which is likewise designed so as to be controllable and has a connection to the control unit 5 for this purpose.

The control unit 5 itself is designed so as to keep the intermediate valve 40 between the compressor 3.3. and the generator 4.3 in an open position during adsorption operation of the vacuum pressure swing adsorption generator 4.3 and to keep the intermediate valve 41 between the mixing chamber 6 and the generator 4.3 in a closed position during such adsorption operation of the generator 4.3. During desorption operation of the vacuum pressure swing adsorption generator 4.3 having at least one inlet, the correspondingly designed associated compressor 3.3. creates a negative pressure at the at least one inlet of the generator 4.3; i.e. a pressure which is reduced to approaching vacuum compared to the ambient pressure. During this desorption phase, the control unit 5 then opens the intermediate valve 41 between the mixing chamber 6 and the generator 4.3, preferably a few seconds, and particularly preferred five seconds, prior to the scheduled end of the desorption phase so that nitrogen-enriched air can flow though the line system 42 directly from the mixing chamber 6 into the at least inlet of the vacuum pressure swing adsorption generator 4.3 before the desorption phase ends. To prevent an obstructing of the influx and interaction with the compressor 3.3, it can then be provided for the intermediate valve 40 between the compressor 3.3 and the generator 4.3 to be brought into a closed position during this pressure equalization process. The passive influx of the nitrogen-enriched air from the mixing chamber into the at least one inlet of the generator 4.3; i.e. not induced by the associated compressor 3.3, then undergoes an increase in pressure prior to the end of the desorption phase at the inlet and within the generator 4.3 to no more than the pressure inside the mixing chamber 6, which occurs relatively rapidly due to bypassing the compressor 3.3 and moreover does not require any energy-intensive operation of the associated compressor 3.3 during said pressure equalization process.

In a subsequent adsorption phase of the vacuum pressure swing adsorption generator 4.3, the associated compressor 3.3 can then bring the generator 4.3 to its operating pressure in a shorter amount of time, whereby the adsorption and thus the providing of nitrogenated air in turn commences earlier. Because the air from mixing chamber 6 used in the pressure equalization is already nitrogenated, the oxygen level in the subsequent adsorption phase of the generator 4.3 starts out lower.

The vacuum pressure swing adsorption generator 4.3 is hereby not limited to one inlet, one single molecular sieve bed respectively, equipped as applicable with a container containing carbon granule. It is instead also conceivable to provide a separate controllable intermediate valve 41 in front of each container, respectively in front of each inlet of the vacuum pressure swing adsorption generator 4.3; i.e. a branching of the line system 42 between the mixing chamber 6 and the generator 4.3 prior to the respective inlets. This thereby enables the alternating adsorption/desorption operation of a vacuum pressure swing adsorption generator 4.3 so that the most continuous flow of nitrogen-enriched air possible will be provided at its inlet 4a.3 for feeding into the enclosed room 2.

The mixing chamber 6 is preferably designed as a comparatively long mixing tube and the outgoing line systems 15.1, 15.2, 15.3 toward the compressors 3.1, 3.2, 3.3 then branch off from the end of such a mixing tube. The appropriate dimensioning of a mixing chamber 6, in particular such a relatively long mixing tube, then ensures an operation which is largely non-interacting even when this type of a passive pressure equalization process uses an additional line system 42 between the mixing chamber 6 and the vacuum pressure swing adsorption generator 4.3. In other words, the appropriate dimensioning of such a mixing chamber 6 configured as a long mixing tube reduces the pressure influence; i.e. the pressure effect on the nitrogen generators 4.1, 4.2, to a harmless value, even when using a vacuum pressure swing adsorption generator 4.3 equipped with a bypass line 42.

Figure 9:
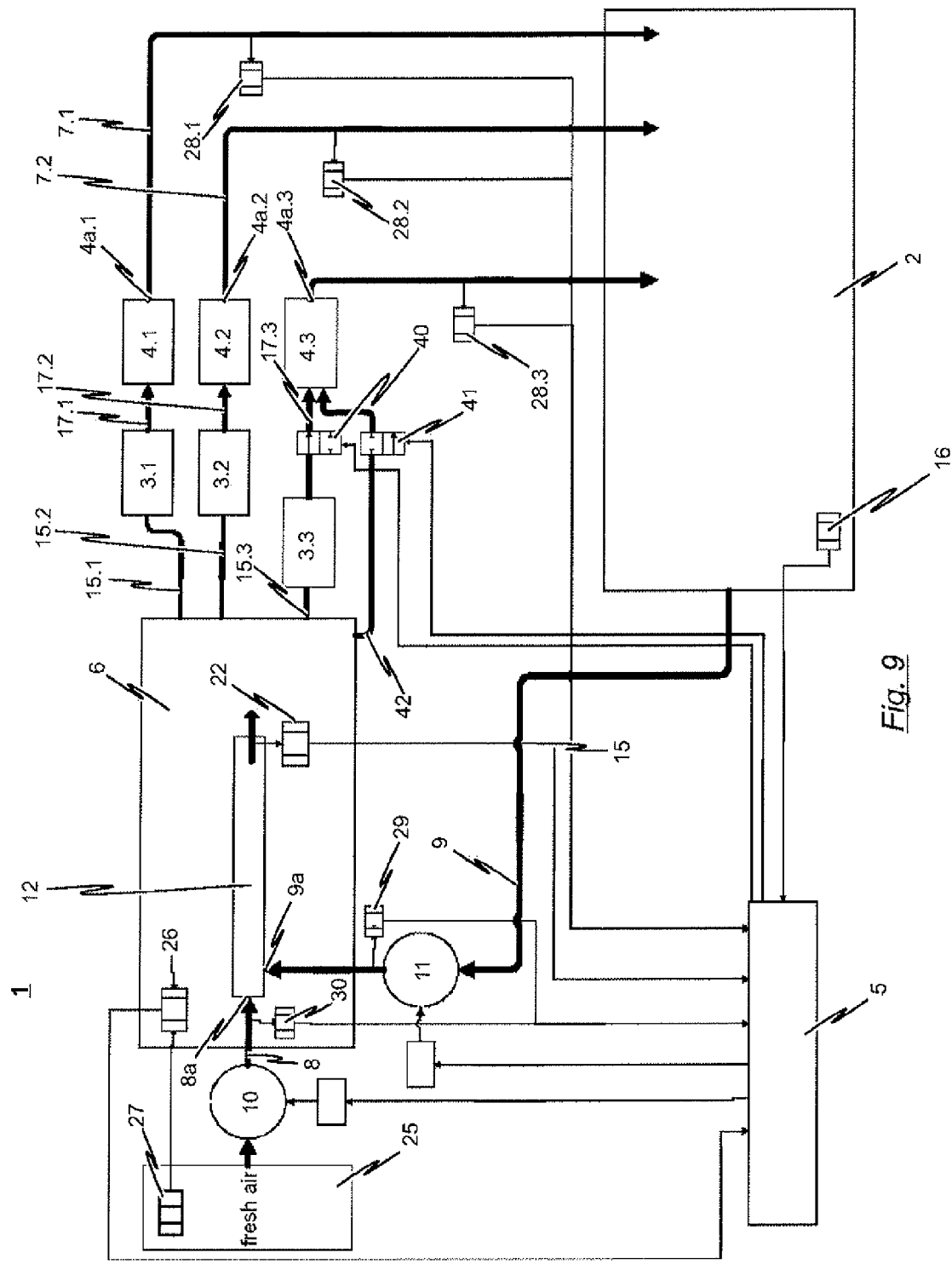
FIG. 9 a schematic view of an inerting system according to a fifth embodiment of the present invention.

In contrast to this fifth embodiment depicted in FIG. 9, such an additional line 42 between the mixing chamber 6 and a vacuum pressure swing adsorption generator 4.3 through the intermediary connection of a correspondingly controllable intermediate valve 41 can then however also be an advantage in the absence of a great plurality of gas separation systems 3.1, 4.1; 3.2, 4.2; 3.3, 4.3 or when nitrogen generators 4.1, 4.2, 4.3 utilizing different gas separation techniques are not employed. Even just providing one vacuum pressure swing adsorption generator 4.3 yields the advantage that, given the appropriate dimensioning of the mixing chamber 6, the passive pressure equalization can be regulated by the intermediate valve 41 prior to the end of the desorption phase of the vacuum pressure swing adsorption generator 4.3 allows the associated compressor 3.3 to be operated for a shorter amount of time in total, thereby providing an energy-saving effect.

A sixth exemplary embodiment of the inventive inerting system 1 will be described in the following with reference being made to the depiction provided in FIG. 10.

The design and functioning of the inerting system 1 according to the sixth embodiment is essentially comparable to the fifth embodiment described above with reference to the FIG. 9 depiction. As in the above-described fifth embodiment, the nitrogen generator 4.3 of the plurality of nitrogen generators 4.1, 4.2 and 4.3 connected in parallel is likewise configured in this sixth embodiment as a vacuum pressure swing adsorption generator based on VPSA technology. The vacuum pressure swing adsorption generator 4.3 in accordance with the sixth embodiment is also connected by means of a line system 17.3 to an associated compressor 3.3 which in turn has a connection to the mixing chamber 6 via line system 15.3. The vacuum pressure swing adsorption generator 4.3 further exhibits an additional inlet directly connected to the mixing chamber 6 by way of an additional line system 42. The nitrogen generator 4.3 configured as a vacuum pressure swing adsorption generator additionally comprises two independently operable adsorption beds 45a and 45b which are connected by way of a respective controllable intermediate valve 44a/44b to an inlet 4a.3 of the nitrogen generator 4.3 which in turn can supply the enclosed room 2 with nitrogen-enriched air through a supply line 7.3. A plurality of additional intermediate valves 40a, 41a, 43a, respectively 40b, 41b, 43b, are provided for each of the molecular sieve beds 45a/45b in the area of the respective molecular sieve bed inlets. All of these intermediate valves are designed to be controllable and can be correspondingly actuated together with the additional intermediate valves 44a, 44b such that the first molecular sieve bed 45a is operated in an adsorption mode during a first respective time period so as to supply the supply line 7.3 with nitrogenated air. During a second period, the second molecular sieve bed 45b is then operated in such an adsorption state as to likewise supply the supply line 7.3 with nitrogenated air. In other words, by means of the respectively alternating adsorption/desorption operation of the molecular sieve beds 45a, 45b, a vacuum pressure swing adsorption generator 4.3 designed as such enables a continuous flow of nitrogenated air output in the supply line 7.3.

During the adsorption operation of the first molecular sieve bed 45a of the vacuum pressure swing adsorption generator 4.3, the intermediate valve 40a between the inlet of the nitrogen generator 4.3 connected to the compressor 3.3. by means of line system 17.3 as well as the associated intermediate valve 44a which regulates the outlet are opened so that nitrogenated air is provided at the outlet 4a.3 of the nitrogen generator 4.3. Intermediate valve 40b is accordingly closed during such adsorption operation of the first molecular sieve bed 45a of the nitrogen generator 4.3 in order to not subject the second molecular sieve bed 45b to compressed air from the compressor 3.3. The second molecular sieve bed 45b is operated in desorption mode during this time, with the intermediate valve 43b being open so as to connect the second molecular sieve bed 45b to the vacuum source V. Intermediate valves 43a and 44b are accordingly closed in this operating mode. Likewise closed are intermediate valves 41a and 41b which can establish a connection to the further line system 42 and thus to mixing chamber 6.

If the nitrogen generator 4.3 configured as a pressure swing adsorption generator is now switched from this operating mode; i.e. from the operating mode in which the first molecular sieve bed 45a is operated in adsorption mode and the second molecular sieve bed 45b is operated in desorption mode, to a reversed operating mode in which the first molecular sieve bed 45a is operated in desorption mode and the second molecular sieve bed 45b is operated in adsorption mode, then shortly before the point in time at which the desorption mode of the second molecular sieve bed 45b is to be ended, the intermediate valves 40a, 40b and 43a, 43b as well as the intermediate valves 44a, 44b arranged as applicable on the outlet side, are closed. At the same time or directly thereafter, intermediate valve 41b is then opened in order to create a direct connection between the mixing chamber 6 and the second molecular sieve bed 45b via the additional line system 42. This results in a passive equalizing of the pressure prevailing within the second molecular sieve bed 45b, whereby air which is already nitrogenated passively flows from the mixing chamber 6 to the second molecular sieve bed 45b in advantageous manner. After the pressure has been equalized, intermediate valve 41b can be closed again and intermediate valve 40b opened to connect the compressor 3.3 to the inlet of the second molecular sieve bed 45b to initiate the adsorption phase in the second molecular sieve bed 45b. In corresponding manner, the outlet-side intermediate valve 44b to provide nitrogenated air at the outlet 4a.3 of the nitrogen generator is opened. At this point, the first molecular sieve bed 45a can operate in desorption mode, with only the intermediate valve 43a, which connects the inlet of the first molecular sieve bed 45a to the vacuum source, needing to be open.

In similar manner, switching this nitrogen generator 4.3 operating with two molecular sieve beds from an operating mode in which the first molecular sieve bed 45a is in desorption mode and the second molecular sieve bed 45b is in adsorption mode with the intermediary step of passive pressure equalization occurring to end the desorption phase in the first molecular sieve bed 45a.

The invention is not limited to the embodiments shown by way of the representations provided in the accompany drawings but instead yields from a synopsis of all the features disclosed herein. In conjunction hereto, it is in particular to be noted that the drawings do not provide a detailed depiction of obvious features which are not essential to the invention. For instance, the drawings do not show the outlet for the oxygenated gas of the respective nitrogen generators 4.1, 4.2, 4.3. Providing a correspondingly designed control unit 5 and appropriately connecting it to the individually controllable elements such as e.g. the intermediate valves can likewise be provided in the sixth embodiment according to FIG. 10.

LIST OF REFERENCE NUMERALS 1 inerting system
2 enclosed room
3.1, 3.2, 3.3 compressor
4.1, 4.2, 4.3 nitrogen generator
4a.1, 4a.2, 4a.3 nitrogen generator outlet
5 control unit 6 mixing chamber
7.1, 7.2, 7.3 supply line
8 (fresh air) supply line
8a fresh air supply line inlet
9 return line
9a return line inlet
10 second fan mechanism
11 first fan mechanism
12 mixing section
13 heat exchanger system
14 booster fan
15.1, 15.2, 15.3 line system between mixing chamber and compressor
16 oxygen measuring system
17.1, 17.2, 17.3 line system between compressor and nitrogen generator
18 filter
19 membrane module
20 thermal insulation
21 residual oxygen content measuring system
23A oxygen measuring system in return line 9
23B oxygen measuring system in supply line 8
24 control valve
25 external area
26 pressure sensor in mixing chamber
27 pressure sensor in external area
28.1, 28.2, 28.3 volumetric flow sensor in supply line 7.1, 7.2, 7.3
29 volumetric flow sensor in return line 9
30 volumetric flow sensor in fresh air supply line 8
40, 40a, 40b intermediate valve between compressor and molecular sieve bed inlet
41, 41a, 41b intermediate valve between mixing chamber and molecular sieve bed inlet
42 line system between mixing chamber and nitrogen generator
43a, 43b intermediate valve between vacuum source and molecular sieve bed inlet
44a, 44b intermediate valve between molecular sieve bed outlet and supply line
45a, 45b molecular sieve bed and vacuum source V

The invention claimed is:

1. An inertization method for preventing and/or extinguishing fire in which a predefinable oxygen content which is lower than normal ambient air is set and maintained in the spatial atmosphere of an enclosed room, wherein the method comprises the following steps:
preparing an initial gas mixture containing oxygen, nitrogen and other components as applicable in a mixing chamber;
separating off at least a portion of the oxygen from said provided initial gas mixture in a gas separation system and thereby providing a nitrogen-enriched gas mixture at an outlet of the gas separation system; and
piping the nitrogen-enriched gas mixture into the spatial atmosphere of the enclosed room,
wherein:
to prepare the initial gas mixture using a fan mechanism provided in a return line system connecting the enclosed room to the mixing chamber, a portion of the ambient air contained within the enclosed room is withdrawn from the room and supplied to the mixing chamber in a regulated manner and the withdrawn portion of the room's air is admixed with fresh air in said regulated manner via a fan mechanism provided in a fresh air supply line system connected to the mixing chamber; and
at least one of the fan mechanism provided in the return line system or the fan mechanism provided in the fresh air supply line system is controlled such that at least one of the volume of air withdrawn from the room per unit of time and supplied to the mixing chamber or the volume of fresh air mixed with the withdrawn volume of room air per unit of time can be set, such that a difference between the pressure prevailing in the mixing chamber and an external ambient atmosphere does not exceed at least one of a predefined or a predefinable upper threshold nor fall short of at least one of a predefined or a predefinable lower threshold.

2. The inertization method according to claim 1, wherein: the upper pressure differential threshold is 1.0 mbar; and the lower pressure differential threshold is 0 mbar.

3. The inertization method according to claim 1, wherein: the upper pressure differential threshold is 0.5 mbar; and the lower pressure differential threshold is 0 mbar.

4. The inertization method according to claim 1, wherein the fan mechanism provided in the fresh air supply line system is controlled such that the volume of spatial air withdrawn from the room per unit of time is identical to the volume of nitrogen-enriched gas mixture supplied to the spatial atmosphere of the enclosed room per unit of time.

5. The inertization method according to claim 1, wherein a residual oxygen content of the nitrogen-enriched gas mixture decreases as the oxygen content in the spatial atmosphere of the enclosed room decreases.

6. The inertization method according to claim 1, wherein:
a residual oxygen content of the nitrogen-enriched gas mixture is set according to a predetermined characteristic curve; and
the characteristic curve specifics a time-optimized value for the residual oxygen content of the nitrogen-enriched gas mixture in relation to the oxygen content in the spatial atmosphere of the enclosed room, according to which an inerting process can set a predefinable reduced oxygen content in the spatial atmosphere of the enclosed room compared to normal ambient air in the shortest amount of time.

7. The inertization method according to claim 1, wherein:
a residual oxygen content of the nitrogen-enriched gas mixture is set according to a predetermined characteristic curve; and
the oxygen content prevailing in the spatial atmosphere of the enclosed room at the respective moment is directly or indirectly measured continuously or at predefined times and/or upon predefined events, and wherein the residual oxygen content in the nitrogen-enriched gas mixture is set continuously or at predefined times and/or upon predefined events to a predefined value at which the inertization method can lower the oxygen content in the spatial atmosphere of the enclosed room to a predefined drawdown value based on the respectively current oxygen content within the shortest amount of time.

8. The inertization method according to claim 1, wherein the oxygen content of the initial gas mixture, from which at least a portion of the oxygen is separated off, is varied as a function of the oxygen content prevailing at the respective moment in the spatial atmosphere of the enclosed room.

9. The inertization method according to claim 1, wherein a residual oxygen content of the nitrogen-enriched gas mixture is varied as a function of the oxygen content prevailing in the spatial atmosphere of the enclosed room at the respective moment.

* * * * *